(12) United States Patent
Isobe

(10) Patent No.: US 8,341,244 B2
(45) Date of Patent: Dec. 25, 2012

(54) DATA DISTRIBUTION COMMUNICATION APPARATUS AND DATA DISTRIBUTION SYSTEM

(75) Inventor: Takashi Isobe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 12/634,939

(22) Filed: Dec. 10, 2009

(65) Prior Publication Data

US 2010/0146082 A1    Jun. 10, 2010

(30) Foreign Application Priority Data

Dec. 10, 2008    (JP) .................................. 2008-313876

(51) Int. Cl.
*G06F 15/177* (2006.01)

(52) U.S. Cl. ........ 709/219; 709/217; 709/223; 709/224; 455/413

(58) Field of Classification Search .................. 709/219, 709/217, 223, 224; 455/413
See application file for complete search history.

(56) References Cited

U.S. PATENT DOCUMENTS

| | | | | |
|---|---|---|---|---|
| 7,143,146 B2* | 11/2006 | Nakatani et al. | ............... | 709/217 |
| 7,284,041 B2* | 10/2007 | Nakatani et al. | ............... | 709/219 |
| 7,363,352 B2* | 4/2008 | Nakatani et al. | ............... | 709/217 |
| 7,475,146 B2* | 1/2009 | Bazot et al. | ................... | 709/227 |
| 7,548,959 B2* | 6/2009 | Nakatani et al. | ............... | 709/217 |
| 7,640,588 B2* | 12/2009 | Saika | ............................. | 726/24 |
| 2002/0077082 A1* | 6/2002 | Cruickshank | ................. | 455/413 |
| 2006/0156030 A1* | 7/2006 | Saika | ............................. | 713/188 |
| 2006/0259611 A1* | 11/2006 | Nakatani et al. | ............... | 709/223 |
| 2007/0078972 A1* | 4/2007 | Yagishita | ....................... | 709/224 |
| 2008/0019522 A1* | 1/2008 | Proctor | ......................... | 380/255 |
| 2008/0168170 A1* | 7/2008 | Nakatani et al. | ............... | 709/224 |
| 2009/0228496 A1* | 9/2009 | Nakatani et al. | ................ | 707/10 |
| 2010/0146082 A1* | 6/2010 | Isobe | ............................ | 709/219 |

FOREIGN PATENT DOCUMENTS

JP    2007-102452    4/2007

* cited by examiner

*Primary Examiner* — Tammy Nguyen
(74) *Attorney, Agent, or Firm* — Antonelli, Terry, Stout & Kraus, LLP.

(57) ABSTRACT

An object of the present invention is to provide a communication apparatus and a data distribution system which are fast in the response speed of data distribution and require less space and less electric power. The present invention provides a communication apparatus which is provided with a broadband transmission module for reproduction by which a constant amount of data is transmitted from an initial data transmission server in a broad band immediately after a client instructs to distribute the data and then, subsequent data is transmitted from a subsequent data transmission server in a normal band, a load balancing module (a module for dispersing a distribution request from a client among plural servers accumulating the same file) and a file dispersion access module (a module for sorting a distribution request from a client into a server storing the file corresponding to the distribution request), and which includes a server arraying module for directly arraying plural servers without using a disk array to integrate resources of the servers into one. Further, the present invention provides a VOD distribution system including the communication apparatus and the plural servers.

8 Claims, 29 Drawing Sheets

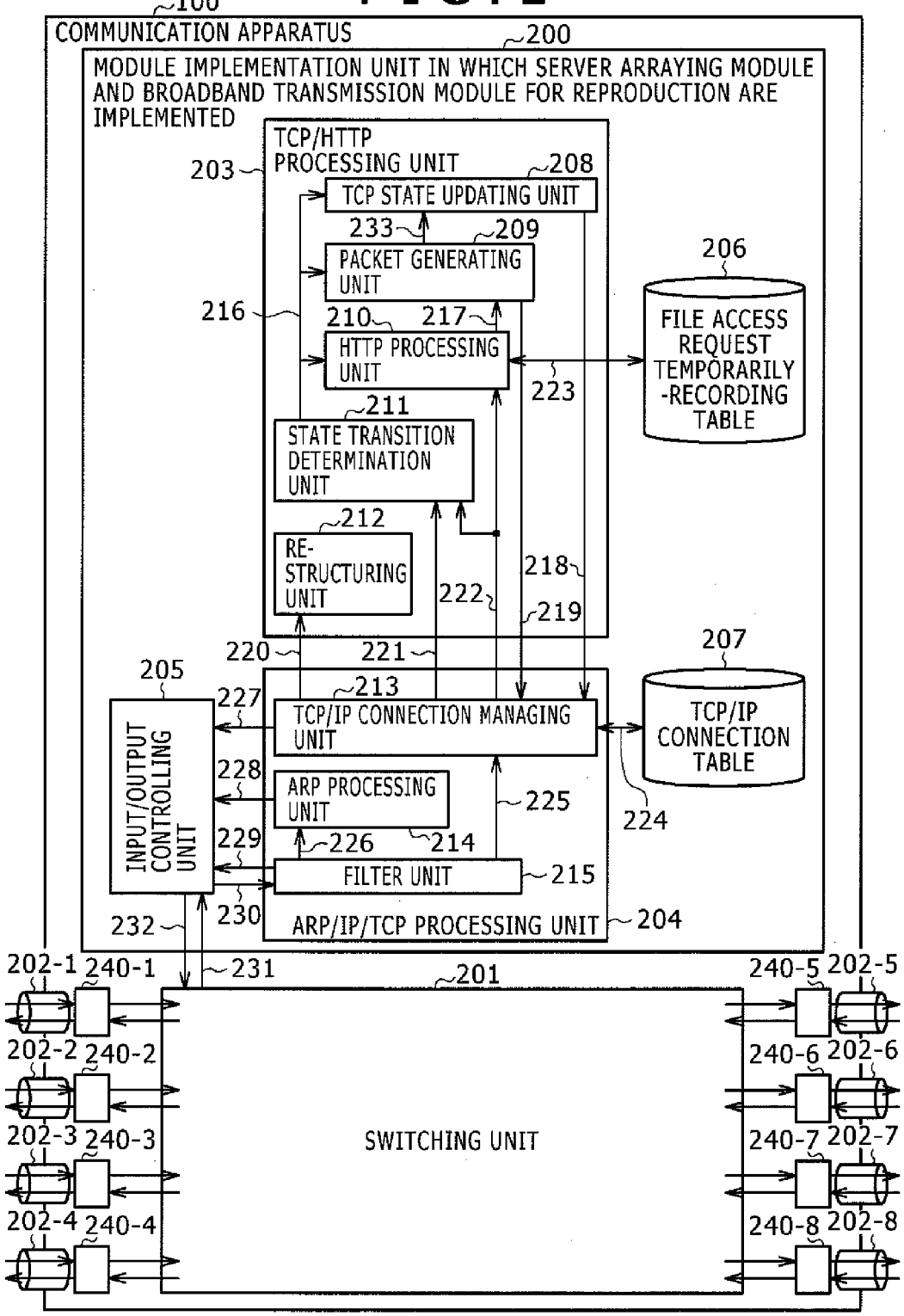

FIG.12
WHEN TRANSMITTING SYN PACKET TO INITIAL DATA TRANSMISSION SERVER
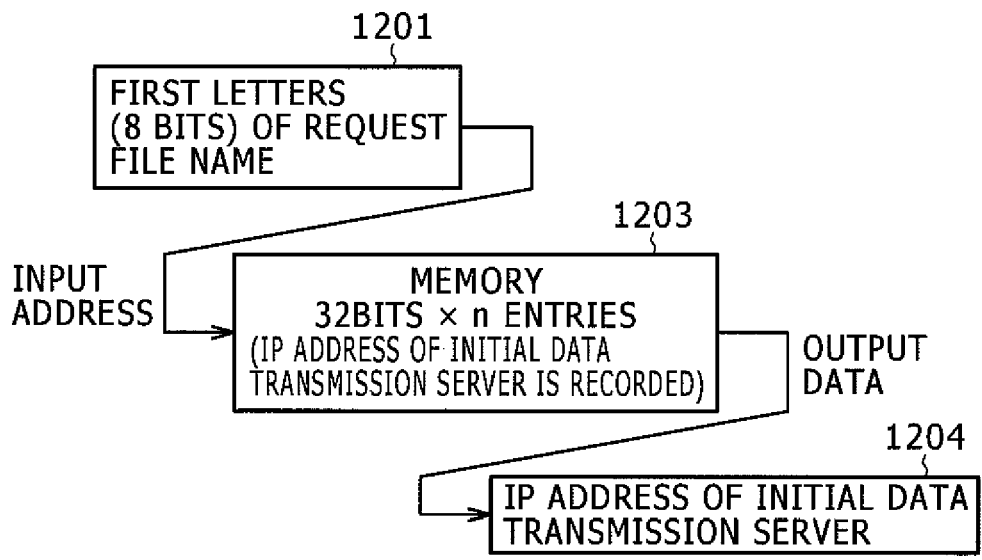
WHEN TRANSMITTING SYN PACKET TO SUBSEQUENT DATA TRANSMISSION SERVER
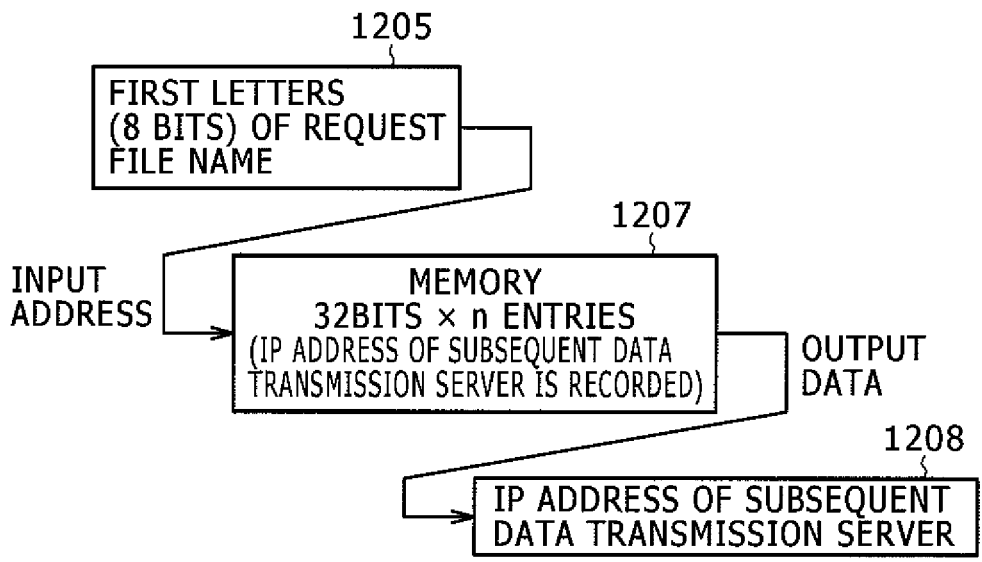

FIG.14
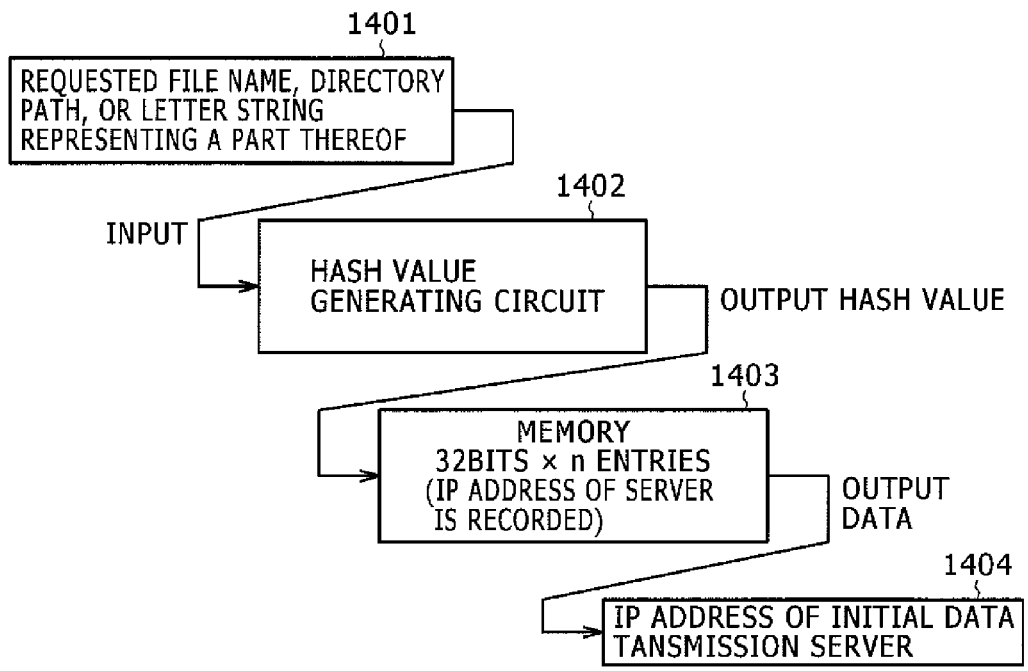
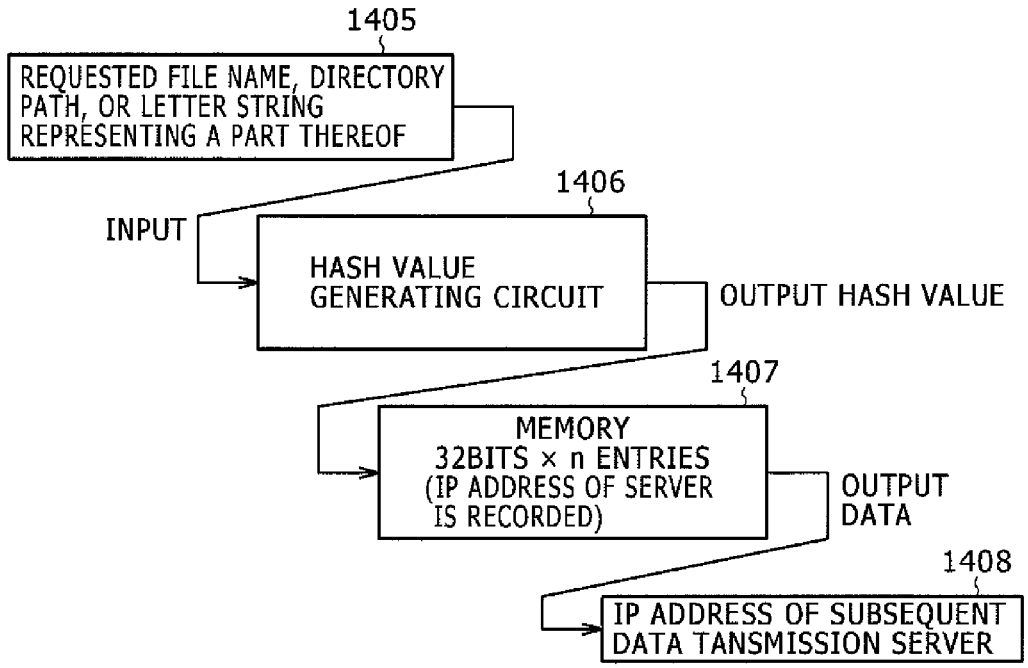

FIG. 16
WHEN TRANSMITTING SYN PACKET TO INTITIAL DATA TRANSMISSION SERVER
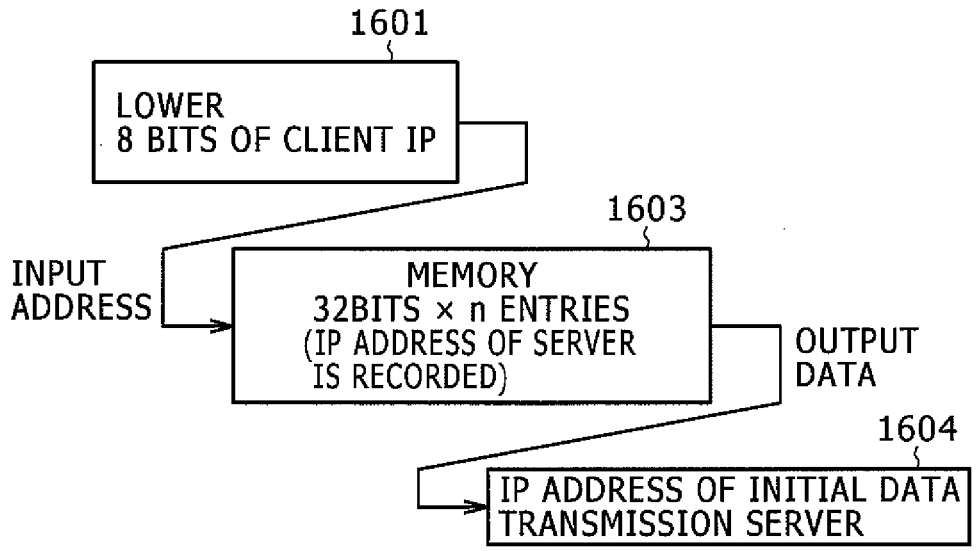
WHEN TRANSMITTING SYN PACKET TO SUBSEQUENT DATA TRANSMISSION SERVER
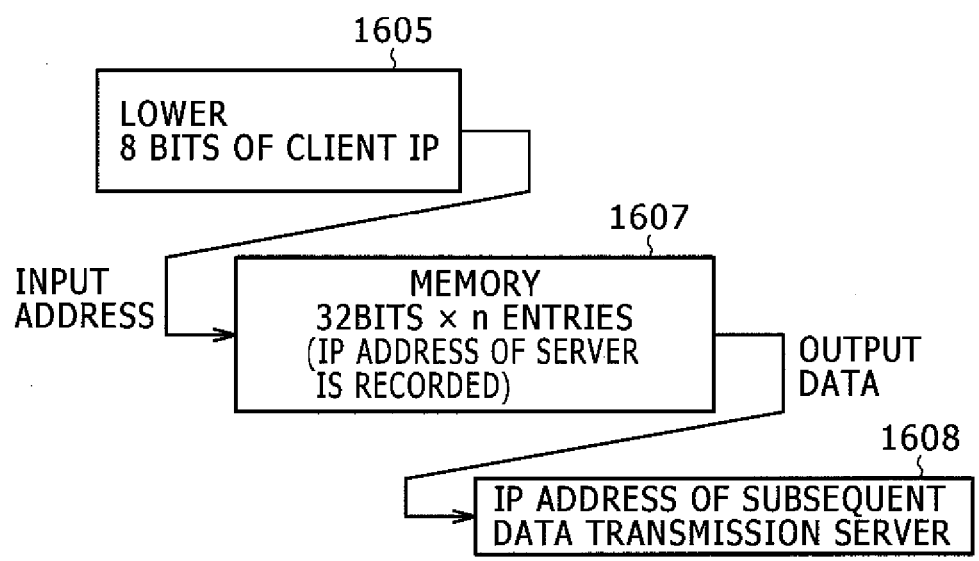

FIG. 17 WHEN TRANSMITTING SYN PACKET TO INTITIAL DATA TRANSMISSION SERVER
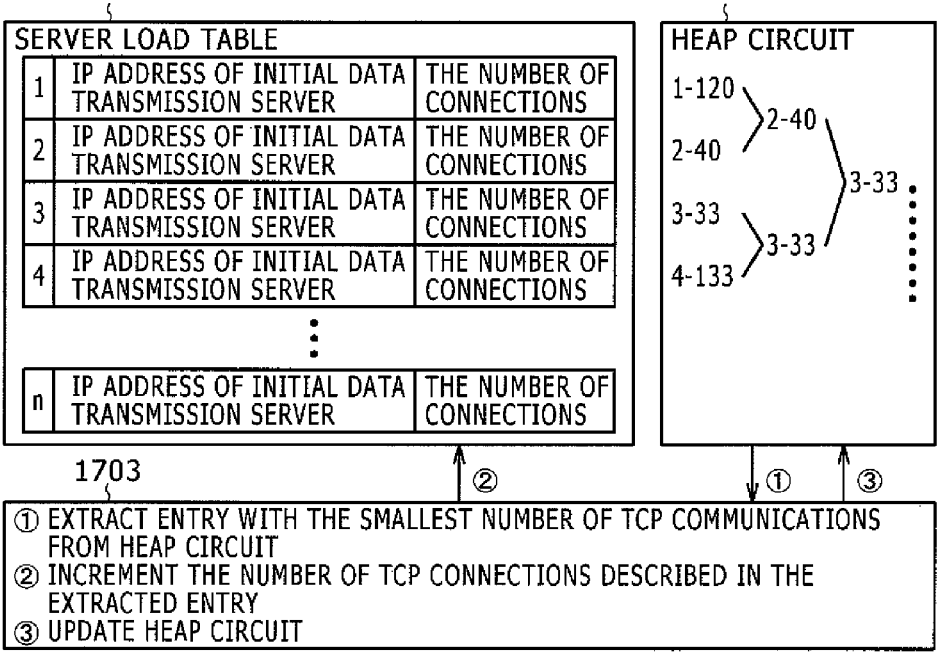
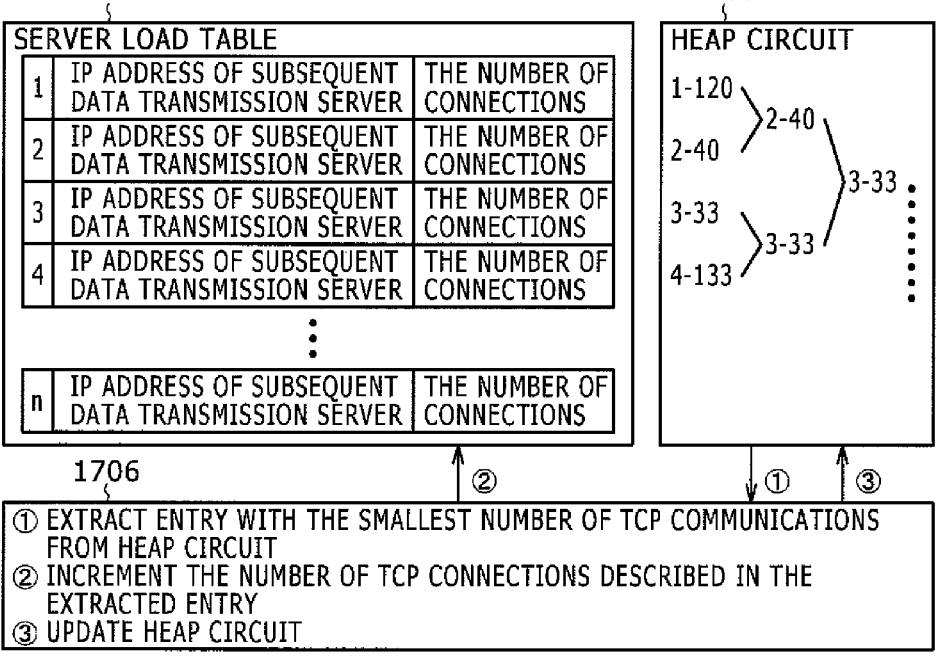

FIG.23

$Bh' = bh + n \cdot r \cdot t \cdot bl$ ............... 2301

$Bh = B - n \cdot bl$ ............... 2302

$bh = B - n \cdot (1 + r \cdot t) \cdot bl$ ............... 2303

$T = \dfrac{bl \cdot t}{bh} = \dfrac{bl}{(B - n \cdot (1 + r \cdot t) \cdot bl)} \cdot t$ ............... 2304

FIG.24

$$Bh' = bh + \frac{n}{m} \cdot r \cdot t \cdot bl \quad \cdots\cdots\cdots\cdots\cdots\cdots\cdots\cdots 2401$$

$$Bh = m + bh + n \cdot r \cdot t \cdot bl \quad \cdots\cdots\cdots\cdots\cdots\cdots\cdots\cdots 2402$$

$$Bh = B - n \cdot bl \quad \cdots\cdots\cdots\cdots\cdots\cdots\cdots\cdots 2403$$

$$bh = \frac{1}{m} \cdot (B - n \cdot (1 + r \cdot t) \cdot bl) \quad \cdots\cdots\cdots\cdots\cdots\cdots 2404$$

$$T = \frac{bl \cdot t}{bh} = m \cdot \frac{bl}{(B - n \cdot (1 + r \cdot t) \cdot bl)} \cdot t \quad \cdots\cdots\cdots\cdots 2405$$

DATA DISTRIBUTION COMMUNICATION APPARATUS AND DATA DISTRIBUTION SYSTEM

CLAIM OF PRIORITY

The present application claims priority from Japanese patent application JP2008-313876 filed on Dec. 10, 2009, the content of which is hereby incorporated by reference into this application.

BACKGROUND OF THE INVENTION

The present invention relates to a technique in which, by using a communication apparatus which is connected to a network, which receives packets transferred through the network to perform different processes in accordance with communication states between a client and a server that transmit and receive packets, and which changes data accumulated within the apparatus, and generates and transmits a new packet to the outside, plural servers are arrayed (coupled as one server), simultaneous transmission of large-volume data to plural users is realized by a system which requires less space and less electric power, and data reproduction in a high-speed response is realized by broadband transmission at the time of reproduction.

The progress of integration of broadcasting and communications increases the needs of large volume of video distribution services, improving a sensory speed, and reduction in server installation cost and power consumption in a data center. A VOD high-speed distribution apparatus and a VOD distribution system for satisfying these needs are required.

As shown in FIG. 28, a conventional video distribution system is a system 2800 which includes a disk array 2801, servers 2802, and a load balancer 2803.

The disk array 2801 is an apparatus obtained by logically integrating plural hard disks into one. Reading and writing are performed using disk access dedicated lines 2805 such as fiber channels or iSCSI.

The servers 2802 are connected to normal communication lines 2806 and the disk access dedicated lines 2805. When receiving a video data distribution request from a client 2804 through the communication line 2806, video data is read from the disk array 2801 through the disk access dedicated line 2805, and the read data is transmitted to the client 2804 through the communication line 2806.

The load balancer 2803 disperses, among plural servers 2802-$i$ ($i$=1 to n), the video data distribution request received from the client 2804 through a communication line 2807.

As shown in FIG. 27, each piece of video reproducing software 2705 of a client 2702 includes a reproducing unit which generates a video and a reception buffer which temporarily accumulates video data.

When the video reproducing software 2705 instructs to reproduce data, a video data distribution request is transmitted from the client 2702 to a server 2701. When the server 2701 receives the video data distribution request from the client 2702, distribution of video data 2703 is started. The video data 2703 is temporarily accumulated in the reception buffer of the video reproducing software 2705 of the client 2702. If the amount of video data accumulated in the reception buffer exceeds a threshold value for starting reproduction, the reproducing unit of the video reproducing software 2705 reads the video data from the reception buffer, and reproducing of the video is started.

After the video reproducing software 2705 instructs to reproduce data, the server transmits the video data corresponding to the threshold value for starting reproduction in a broad band, and shortens time for the amount of video data accumulated in the reception buffer to exceed the threshold value for starting reproduction, so that the response speed (time from an instruction of reproduction to starting of reproduction) of video reproduction can be shortened. It is possible to realize video reproduction with a high sensory speed.

In the case where the server transmits the video data in a broad band after the instruction of reproduction, the server needs to be provided with a throughput performance 2603 for high-speed reproduction in addition to a throughput performance 2604 for normal distribution, as shown in FIG. 26.

BRIEF SUMMARY OF THE INVENTION

Two problems involved in the data distribution system obtained by combining the disk array, the servers and the load balancer such as the above-described video data distribution system will be described below.

The first problem will be described first.

In the system using the disk array and the servers, an arithmetic circuit substrate for arraying the hard disks, and interfaces such as fiber channels or iSCSI are mounted in the disk array. Interfaces to be connected to the disk array are mounted in the servers as well. The elements mounted in the disk array cause a problem that power consumption and a system-occupied space are increased.

Next, the second problem will be described using FIG. 25 and FIG. 26.

In the case where a server 2601 transmits the video data in a broad band after the instruction of reproduction, the server 2601 needs to be provided with the throughput performance 2603 for high-speed reproduction in addition to the throughput performance 2604 for normal distribution. The throughput performance 2603 for high-speed reproduction is used when data corresponding to the threshold value for starting reproduction is transmitted.

In a data distribution system used for conventional video distribution, a load balancer 2500 transmits a data distribution request received from a client to each server on the basis of only the load of each server which changes every second. Accordingly, it is impossible to preliminarily recognize what server distributes data, and as a result, each of servers 2504, 2505, and 2506 transmits data corresponding to the threshold value for starting reproduction in a broad band after the instruction of reproduction. Thus, the throughput performance for high-speed reproduction in addition to the throughput performance for normal distribution is needed in each server. If it is assumed that an average transmission band at the time of broadband transmission is bh (Mbps), a transmission band at the time of normal distribution is bl (Mbps), the number of server lines is m (lines), the number of clients is n (pieces), a frequency of changing an instruction of reproduction and a reproduced section per one client is r (the number of times/second), and a threshold value for starting reproduction (represented by multiplying a transmission band at the time of normal distribution by t seconds) of the reception buffer of the data reproducing software is bl/8·t (Mbyte), a total value Bh of the throughput performances for high-speed reproduction necessary for the lines of each server is obtained as follows.

In each line of the servers, bl/8·t (Mbyte) of data corresponding to the threshold value for starting reproduction is transmitted at a frequency of n/m·r (the number of times/second). Thus, an average throughput performance of bl/8·t·8·n/m·r (Mbps) for high-speed reproduction is required. Further, transmission of data corresponding to the threshold value for starting reproduction requires a broad band. Accordingly, a throughput performance for high-speed reproduction corresponding to the average transmission band bh (Mbps) at the time of broadband transmission is additionally required.

On the basis of the above, a throughput performance Bh' for high-speed reproduction necessary for each line of the servers and the total value Bh (Mbps) of the throughput performances for high-speed reproduction necessary for the all lines are represented by formulae 2401 and 2402 of FIG. 24, respectively.

Further, if it is assumed that the total value of the throughput performances of the all lines of the servers is B (Mbps), the total value Bh of the throughput performances for high-speed reproduction necessary for the all lines corresponds to a difference between the total value B of the throughput performances of the all lines and a total value n·bl of transmission bands at the time of normal distribution. (formula 2403)

By using the formulae 2402 and 2403, the average transmission band bh (Mbps) at the time of broadband transmission is represented by a formula 2404.

Thus, the response time (transmission time when data corresponding to the threshold value for starting reproduction is transmitted in a broad band) T (seconds) of reproduction is represented by a formula 2405. Accordingly, in the conventional data distribution system where each of the servers 2504, 2505, and 2506 transmits data corresponding to the threshold value for starting reproduction after the instruction of reproduction, the larger the number m of server lines becomes, the longer the response time T of reproduction becomes.

As described above, the data distribution system obtained by combining the disk array, the servers, and the load balancer involves two problems, namely, power consumption and a system-occupied space become large, and the larger the number of server lines becomes, the longer the response time of reproduction becomes.

Next, a problem involved in the load balancer used in data distribution such as the video distribution will be described below.

The load balancer 2500 used for the data distribution system such as the conventional video distribution transmits a data distribution request received from a client to each server on the basis of only the load of each server. Accordingly, in the data distribution system using the disk array and the servers, it is necessary to control an access to the requested file in the disk array, and an arithmetic circuit substrate for arraying the hard disks or interfaces such as fiber channels or iSCSI need to be mounted. Further, it is necessary for even the servers to be provided with interfaces to be connected to the disk array. That is, the data distribution request is transmitted by the load balancer 2500 to each server on the basis of only the load of the server, which leads to the necessity of the elements mounted in the disk array, resulting in increase of power consumption and a system-occupied space of the data distribution system.

Further, as described above, the load balancer 2500 used for the data distribution system such as the conventional video distribution system transmits the data distribution request received from the client to each server on the basis of only the load of each server which changes every second. Accordingly, it is impossible to preliminarily recognize what server distributes data, and as a result, each of the servers 2504, 2505, and 2506 transmits data corresponding to the threshold value for starting reproduction in a broad band after the instruction of reproduction as shown in FIG. 25. Thus, if the conventional load balancer 2500 is used for the data distribution system, the throughput performance for high-speed reproduction in addition to the throughput performance for normal distribution is needed in each server.

If it is assumed that an average transmission band at the time of broadband transmission is bh (Mbps), a transmission band at the time of normal distribution is bl (Mbps), the number of server lines is m (lines), the number of clients is n (pieces), a frequency of changing an instruction of reproduction and a reproduced section per one client is r (the number of times/second), and a threshold value for starting reproduction (represented by multiplying a transmission band at the time of normal distribution by t seconds) of the reception buffer of the data reproducing software is bl/8·t (Mbyte), then a total value Bh of the throughput performances for high-speed reproduction necessary for each line of the servers is obtained as follows.

In each line of the servers, bl/8·t (Mbyte) of data corresponding to the threshold value for starting reproduction is transmitted at a frequency of n/m·r (the number of times/second). Thus, an average throughput performance of bl/8·t·8·n/m·r (Mbps) for high-speed reproduction is required. Further, transmission of data corresponding to the threshold value for starting reproduction requires a broad band. Accordingly, a throughput performance for high-speed reproduction corresponding to the average transmission band bh (Mbps) at the time of broadband transmission is additionally required.

On the basis of the above, a throughput performance Bh' for high-speed reproduction necessary for each line of the servers and the total value Bh (Mbps) of the throughput performances for high-speed reproduction necessary for the all lines are represented by formulae 2401 and 2402 of FIG. 24, respectively.

Further, if it is assumed that the total value of the throughput performances of the all lines of the servers is B (Mbps), the total value Bh of the throughput performances for high-speed reproduction necessary for the all lines corresponds to a difference between the total value B of the throughput performances of the all lines and a total value n·bl of transmission bands at the time of normal distribution. (formula 2403)

By using the formulae 2402 and 2403, the average transmission band bh (Mbps) at the time of broadband transmission is represented by a formula 2404.

Thus, the response time (transmission time when data corresponding to the threshold value for starting reproduction is transmitted in a broad band) T (seconds) of reproduction is represented by a formula 2405. Accordingly, if the conventional load balancer is used for the data distribution system such as the video distribution system, the throughput performance for high-speed reproduction in addition to the throughput performance for normal distribution is needed in each server, and the larger the number m of server lines becomes, the longer the response time T of reproduction becomes.

According to an aspect of the present invention, there is provided a network system including a first server and a second server which transmit data to a data destination apparatus, and a communication apparatus which is connected to the data destination apparatus, the first server and the second server through communication lines, wherein the communication apparatus includes: a first reception unit which receives a first file access request for requesting transmission of data in files contained in the first server and the second server from the data destination apparatus; a file access request processing unit which generates, on the basis of the first file access request, a second file access request for requesting the first server to transmit part of data in the files and a third file access request for requesting the second server to transmit data subsequent to the part of data in the files; and a first transmission unit which transmits the second file access request to the first server, and transmits the third file access request to the second server after the first server completes the transmission of the part of data on the basis of the second file access request, the first server includes: a second reception unit which receives the second file access request transmitted by the communication apparatus; and a second transmission unit which transmits the part of data in the files on the basis of the second file access request, and the second server includes: a third reception unit which receives the third file access request; and a third transmission unit which transmits the data subsequent to the part of data in the files on the basis of the third file access request.

Further, according to another aspect of the present invention, there is provided a network system including a first server and a second server which transmit data to a data destination apparatus, and a communication apparatus which is connected to the data destination apparatus, the first server and the second server through communication lines, wherein the communication apparatus includes: a first reception unit which receives a first file access request for requesting transmission of data in files contained in the first server and the second server from the data destination apparatus; a file access request processing unit which generates, on the basis of the first file access request, a second file access request for requesting the first server to transmit part of data in the files and a third file access request for requesting the second server to transmit data subsequent to the part of data in the files; and a first transmission unit which transmits the second file access request to the first server, and transmits the third file access request to the second server when a specified time passes after transmission of the second file access request, the first server includes: a second reception unit which receives the second file access request transmitted by the communication apparatus; and a second transmission unit which transmits the part of data in the files on the basis of the second file access request, and the second server includes: a third reception unit which receives the third file access request; and a third transmission unit which transmits the data subsequent to the part of data in the files on the basis of the third file access request.

On the other hand, according to still another aspect of the present invention, there is provided a communication apparatus connected, through communication lines, to a data destination apparatus, and a first server and a second server which transmit data to the data destination apparatus, the communication apparatus including: a first reception unit which receives a first file access request for requesting transmission of data in files contained in the first server and the second server from the data destination apparatus; a file access request processing unit which generates, on the basis of the first file access request, a second file access request for requesting the first server to transmit part of data in the files and a third file access request for requesting the second server to transmit data subsequent to the part of data in the files; and a first transmission unit which transmits the second file access request to the first server, and transmits the third file access request to the second server after the first server completes the transmission of the part of data on the basis of the second file access request.

Further, according to still another aspect of the present invention, there is provided a communication apparatus connected, through communication lines, to a data destination apparatus, and a first server and a second server which transmit data to the data destination apparatus, the communication apparatus including: a first reception unit which receives a first file access request for requesting transmission of data in files contained in the first server and the second server from the data destination apparatus; a file access request processing unit which generates, on the basis of the first file access request, a second file access request for requesting the first server to transmit part of data in the files and a third file access request for requesting the second server to transmit data subsequent to the part of data in the files; and a first transmission unit which transmits the second file access request to the first server, and transmits the third file access request to the second server when a specified time passes after transmission of the second file access request.

In the network system disclosed in this application of the present invention, effects obtained from representative aspects will be briefly described. Without using a disk array, plural servers are directly arrayed by a load balancing module (a module for dispersing a distribution request from a client among plural servers which accumulate the same file) and a file dispersion access module (a module for sorting a distribution request from a client into a server storing the file corresponding the distribution request). Accordingly, elements (an arithmetic circuit substrate for arraying the hard disks and interfaces such as fiber channels or iSCSI) to be mounted in the disk array used in the conventional method are not necessary. Thus, it is possible to provide a data distribution apparatus and a data distribution system in which power consumption and an occupied space used by unnecessary elements are reduced and a performance per 1 W·IU is improved.

Further, irrespective of the number m of server lines, the response speed of reproduction becomes constant, and thus, it is possible to provide a data distribution apparatus and a data distribution system in which the response time of reproduction becomes fast by m times as compared to the conventional ones.

It should be noted that if it is assumed that an average transmission band at the time of broadband transmission is bh (Mbps), a transmission band at the time of normal distribution is bl (Mbps), the number of server lines is m (lines), the number of clients is n (pieces), a frequency of changing an instruction of reproduction and a reproduced section per one client is r (the number of times/second), and a threshold value for starting reproduction (represented by multiplying a transmission band at the time of normal distribution by t seconds) of the reception buffer of the data reproducing software is bl/8·t (Mbyte), then a total value Bh of the throughput performances for high-speed reproduction necessary for the lines of the dedicated servers is obtained as follows.

In each line of the servers, bl/8·t (Mbyte) of data corresponding to the threshold value for starting reproduction is transmitted at a frequency of n·r (the number of times/second). Thus, an average throughput performance of bl/8·t·8·n·r (Mbps) for high-speed reproduction is required. Further, transmission of data corresponding to the threshold value for starting reproduction requires a broad band. Accordingly, a throughput performance for high-speed reproduction corresponding to the average transmission band bh (Mbps) at the time of broadband transmission is additionally required.

On the basis of the above, the total value Bh (Mbps) of the throughput performances for high-speed reproduction necessary for the lines of the dedicated servers is represented by a formula 2301 of FIG. 23.

Further, if it is assumed that the total value of the throughput performances of the all lines of the servers is B (Mbps), the total value Bh of the throughput performances for high-speed reproduction necessary for the all lines corresponds to a difference between the total value B of the throughput performances of the all lines and a total value n·bl of transmission bands at the time of normal distribution. (formula 2302)

By using the formulae 2301 and 2302, the average transmission band bh (Mbps) at the time of broadband transmission is represented by a formula 2303.

Thus, the response time (transmission time when data corresponding to the threshold value for starting reproduction is transmitted in a broad band) T (seconds) of reproduction is represented by a formula 2304. The response time T of reproduction is constant irrespective of the number m of server lines.

In the communication apparatus disclosed in this application of the present invention, effects obtained from representative aspects will be briefly described.

In the communication apparatus disclosed in the application, plural servers can be directly arrayed by a load balancing module (a module for dispersing a distribution request from a client among plural servers which accumulate the same file) and a file dispersion access module (a module for sorting a distribution request from a client into a server storing the file corresponding the distribution request). Accordingly, elements (an arithmetic circuit substrate for arraying the hard disks and interfaces such as fiber channels or iSCSI) to be mounted in the disk array used in the conventional method are not necessary in the data distribution apparatus and the data distribution system. Thus, by using the communication apparatus disclosed in this application in the data distribution apparatus and the data distribution system, it is possible to reduce power consumption and an occupied space used by unnecessary elements of the data distribution apparatus and the data distribution system and to improve a performance per 1 W·IU.

Further, by using the communication apparatus disclosed in the application, the response speed of reproduction becomes constant irrespective of the number m of server lines, and thus, it is possible to provide a data distribution apparatus and a data distribution system in which the response time of reproduction becomes fast by m times as compared to the conventional ones.

BRIEF DESCRIPTION OF THE DRAWINGS

FIG. 2 is a configuration block diagram of a communication apparatus according to the embodiment of the present invention;

FIG. 12 is an explanation diagram of an example of a selecting method of an IP address of the server according to the embodiment of the present invention;

FIG. 14 is an explanation diagram of an example of a selecting method of an IP address of the server according to the embodiment of the present invention;

FIG. 16 is an explanation diagram of an example of a selecting method of an IP address of the server according to the embodiment of the present invention;

FIG. 17 is an explanation diagram of an example of a selecting method of an IP address of the server according to the embodiment of the present invention;

FIG. 23 shows explanation formulae for a response time of reproduction in a conventional video data distribution system;

FIG. 24 shows explanation formulae for a response time of reproduction in the data distribution system according to the embodiment of the present invention;

DETAILED DESCRIPTION OF THE INVENTION

Figure 1A:
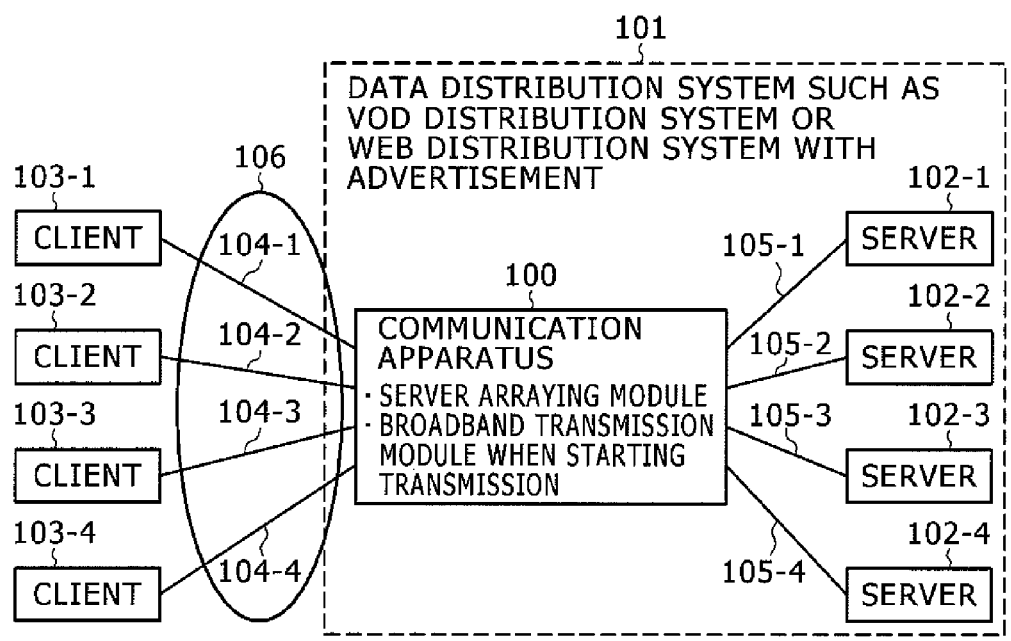
FIGS. 1A and 1B are explanation diagrams of a data distribution system according to an embodiment of the present invention.

In the following embodiment, an explanation will be made in plural divided sections or embodiments if needed as a matter of convenience. However, the sections or embodiments have a relation with each other unless otherwise specified, and one is for a modified example, a detailed explanation or a complementary explanation of a part or all of the other. In addition, if the number (including value, amount, range and the like) of constitutional elements is referred to in the following embodiment, the embodiment is not limited to a specified number and any number larger or smaller than the specified number may be used unless otherwise specified and unless the embodiment is apparently limited to the specified number in principle.

Further, it is obvious that the constituent elements (including element steps and the like) are not necessarily essential in the following embodiment unless otherwise specified and unless they are considered to be apparently essential in principle. Likewise, if the shapes and positional relations of constituent elements are referred to, constituent elements substantially approximate or similar to the shapes and the like are included unless otherwise specified and unless the shapes and positional relations are considered to be incorrect in principle. This is also applied to the value and the range.

Hereinafter, an embodiment of the present invention will be described in detail on the basis of the drawings. It should be noted that the same constituent elements are given the same reference numerals in principle throughout the all drawings for explaining the embodiment, and the explanations thereof will not be repeated.

Embodiment

Hereinafter, an embodiment of the present invention will be described using the drawings.

FIG. 1 is a configuration block diagram of an information processing system 101 according to the embodiment. It is assumed that the information processing system 101 is used as a VOD distribution system and a Web distribution system with advertisement.

Figure 6:
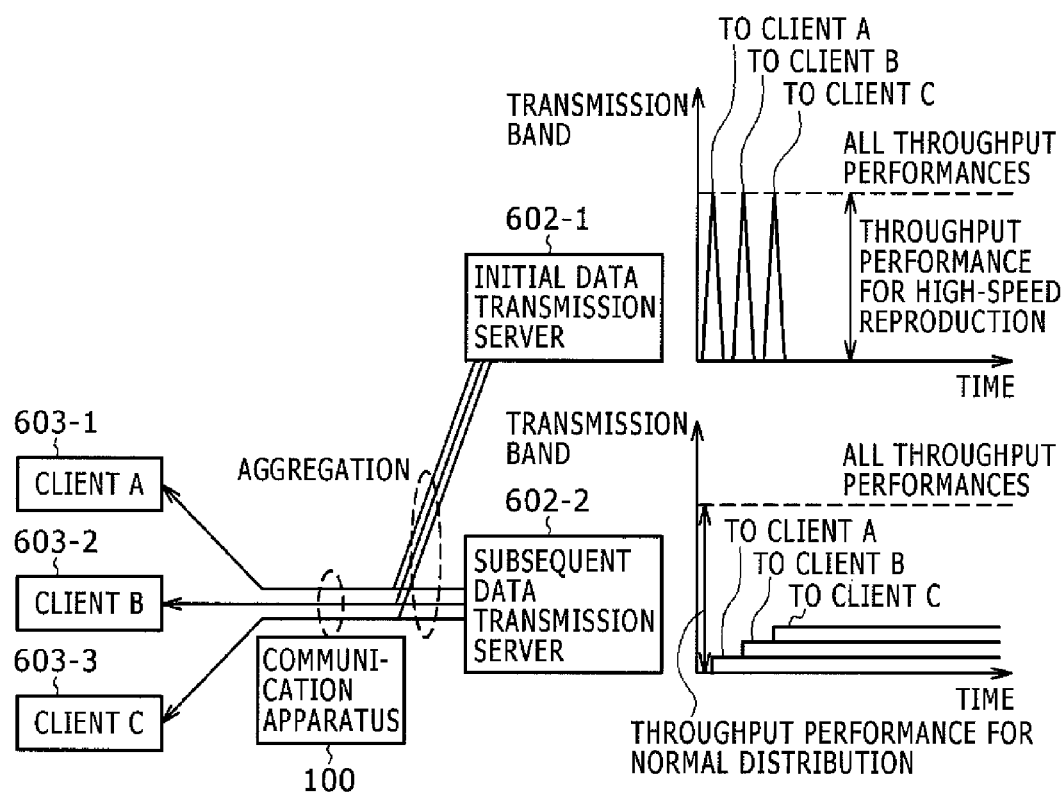
FIG. 6 is an explanation diagram of the data distribution system including an initial data transmission server and a subsequent data transmission server according to the embodiment of the present invention.

In the case where the information processing system is used as the VOD distribution system, two types, i.e., an initial data transmission server 602-1 and a subsequent data transmission server 602-2, are prepared, as shown in, for example, FIG. 6. When data is distributed to clients A to C (603-1 to 603-3), data corresponding to a threshold value for starting reproduction of a reception buffer is transmitted from the initial data transmission server 602-1 in a broad band immediately after each piece of data reproducing software of the clients A to C (603-1 to 603-3) instructs to reproduce data. Thereafter, the subsequent data is transmitted from the subsequent data transmission server 602-2 in a normal distribution band.

The information processing system 101 includes a communication apparatus 100 and servers 102-*i* (i=1 to 4). The communication apparatus 100 is connected to the servers 102 through communication lines 105-*i* (i=1 to 4). Further, the communication apparatus 100 is connected to clients 103-*i* (i=1 to 4) through lines 104 of a network 106.

Figure 1B:
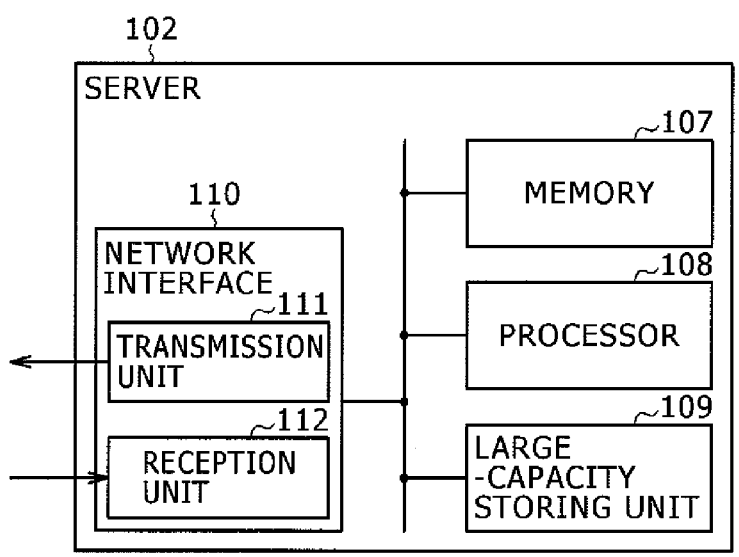

As shown in FIG. 1B, each server 102 is an apparatus configured in such a manner that a processor 108, a memory 107, a large-capacity storing unit 109, and a network interface 110 including a transmission unit 111 and a reception unit 112 are connected to each other.

FIG. 2 shows a configuration of the communication apparatus 100.

The communication apparatus 100 includes transmission/reception units 240, a switching unit 201, and a module implementation unit 200 in which a server arraying module and a broadband transmission module for reproduction are implemented.

The switching unit 201 receives packet data through the transmission/reception unit 240-*i* from one of communication lines 202-*i* (i=1 to 8), or from the module implementation unit 200, and transmits the packet data to a different communication line 202 through the transmission/reception unit 240-*i*, or transmits the packet data to the module implementation unit 200.

Figure 29:
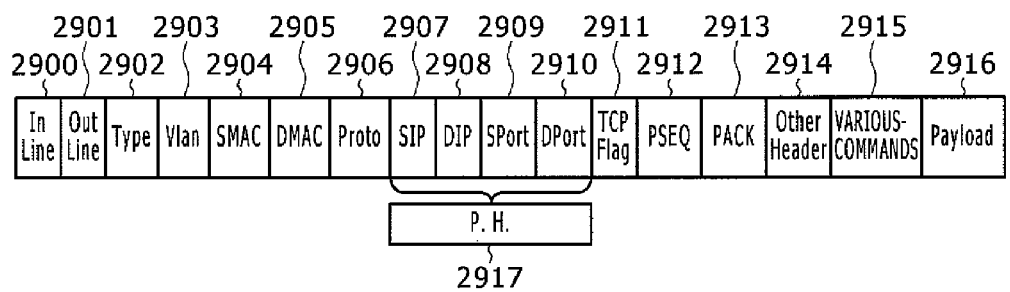
FIG. 29 is a format diagram of packet data according to the embodiment of the present invention.

FIG. 29 shows an example of a format of packet data transmitted and received within the communication apparatus 100.

The packet data includes an InLine 2900, an OutLine 2901, a Type 2902, a Vlan 2903, an SMAC 2904, a DMAC 2905, a Proto 2906, an SIP 2907, a DIP 2908, an SPort 2909, a DPort 2910, a TCP Flag 2911, a PSEQ 2912, a PACK 2913, an OtherHeader 2914, a various-commands 2915, and a Payload 2916. Further, the SIP 2907, DIP 2908, SPort 2909, and DPort 2910 are collectively represented as a packet header (P.H.) 2917 in the embodiment. The P.H. 2917 shows the characteristics of the packet data.

Here, the InLine 2900 stores an input line number that is an identification number of a line through which the packet is input. The OutLine 2901 stores an output line number that is an identification number of a line through which the packet is output. The Type 2902 stores an identification number for identifying a protocol of a network layer. The Vlan 2903 stores a number for identifying a VLAN. The SMAC 2904 stores a source MAC address that is a source address of a data link layer. The DMAC 2905 stores a destination MAC address that is a destination address. The Proto 2906 stores an identification number for identifying a protocol of a transport layer such as a UDP (User Datagram Protocol). The SIP 2907 stores a source address, namely, a source IP address that is an address of a terminal on the transmission side. The DIP 2908 stores a destination address, namely, a destination IP address that is an address of a terminal on the reception side. The SPort 2909 stores a source port of a TCP. The DPort 2910 stores a destination port of a TCP. The TCP Flag 2911 stores a TCP flag number. The PSEQ 2912 stores a transmission sequence number (SEQ number). The PACK 2913 stores a reception sequence number (ACK number). The OtherHeader 2914 stores other IP/TCP header data. The various-commands 2915 stores a command of an application layer. The Payload 2916 stores data other than the packet header and the various-commands.

The module implementation unit 200 (FIG. 2) includes an input/output controlling unit 205, an ARP/IP/TCP processing unit 204, a TCP/HTTP processing unit 203, a TCP/IP connection table 207, and a file access request temporarily-recording table 206.

Figure 3:
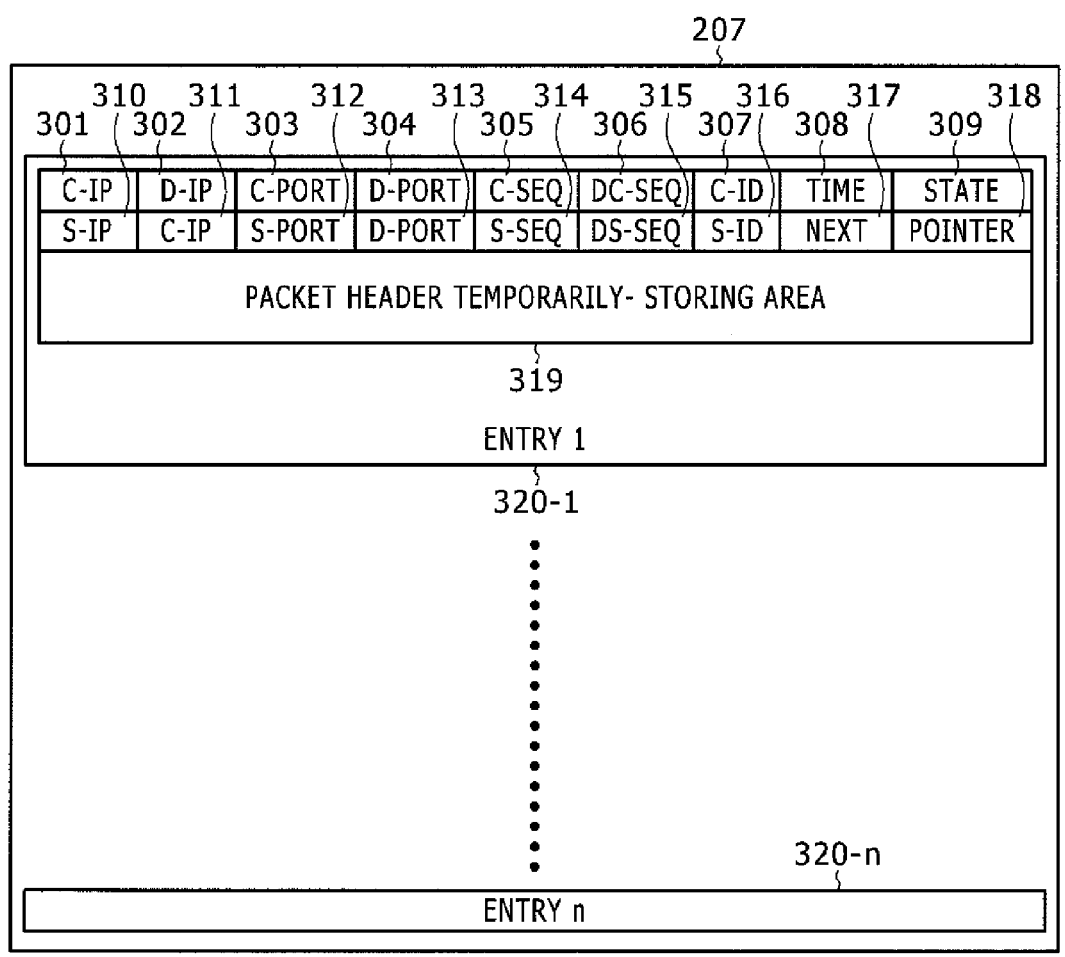
FIG. 3 is a format diagram of a TCP/IP connection table mounted in the communication apparatus according to the embodiment of the present invention.

FIG. 3 shows an example of a format of the TCP/IP connection table.

Each of entries 320-*i* (i=1 to n) includes a C-IP 301, a D-IP 302, a C-PORT 303, a D-PORT 304, a C-SEQ 305, a DC-SEQ 306, a C-ID 307, a TIME 308, a STATE 309, an S-IP 310, a C-IP 311, an S-PORT 312, a D-PORT 313, an S-SEQ 314, a DS-SEQ 315, an S-ID 316, a NEXT 317, a POINTER 318, and a packet header temporarily-storing area 319.

The C-IP 301 records an IP address of a client. The D-IP 302 records a unique IP address released to the network 106 by the communication apparatus 100. The C-PORT 303 records a TCP port number of a client. The D-PORT 304 records a TCP port number released to the network 106 by the communication apparatus 100. The C-SEQ 305 records a TCP sequence number of a host on the client side. The DC-SEQ 306 records a TCP sequence number of the communication apparatus 100 for a host on the client side. The C-ID 307 records an ID number of an IP packet transmitted to a host on the client side by the communication apparatus 100. The TIME 308 records the latest time when the packet is received. The STATE 309 records a state of TCP connection. The S-IP 310 records an IP address of a server. The C-IP 311 records an IP address of a client. The S-PORT 312 records a TCP port number of a server. The D-PORT 313 records a TCP port number released to the network 106 by the communication apparatus 100. The S-SEQ 314 records a TCP sequence number of a host on the server side. The DS-SEQ 315 records a TCP sequence number of the communication apparatus 100 for a host on the server side. The S-ID 316 records an ID number of an IP packet transmitted to a host on the server side by the communication apparatus 100. The NEXT 317 records presence or absence of a conflict of a hash value calculated when an address is generated. The POINTER 318 records a pointer to the file access request temporarily-recording table.

The input/output controlling unit 205 (FIG. 2) receives a packet 231 from the switching unit 201, and transmits a packet 230 to the ARP/IP/TCP processing unit 204. Further, the input/output controlling unit 205 receives packets 227 to 229 transmitted from the ARP/IP/TCP processing unit 204, and outputs a packet 232 to the switching unit 201.

The ARP/IP/TCP processing unit 204 (FIG. 2) includes a filter unit 215, an ARP processing unit 214, and a TCP/IP connection managing unit 213. When receiving the packet 230 from the input/output controlling unit 205, the filter unit 215 (FIG. 2) determines whether or not the packet is the processing target. The communication apparatus 100 releases its unique IP address and MAC address to the network 106 on the client side. In the case where the packet 230 is an ARP REQUEST packet used for inquiring the unique MAC address, a packet 226 is transmitted to the ARP processing unit 214. In addition, in the case where the packet 230 is to be transmitted to the unique IP address and has a specific number (for example, 80 or the like) that is preliminarily set by the destination port number DPort 2910, a packet 225 is transmitted to the TCP/IP connection managing unit 213.

Upon receiving the ARP REQUEST packet 226, the ARP processing unit 214 (FIG. 2) generates and outputs an ARP REPLY packet 228 in which the unique MAC address is described.

When receiving the TCP/IP packet 225 to be transmitted to the unique IP address and TCP port number, the TCP/IP connection managing unit (FIG. 2) accesses the TCP/IP connection table 207, and reads and initializes an entry 320 corresponding to the packet header P.H. 2917 (224). Further, the TCP/IP connection managing unit receives a new TCP state 218 and new packet data 219 from the TCP/HTTP processing unit, writes a new TCP state 224 into the TCP/IP connection table 207 (224), and outputs the new packet data 219 to the input/output controlling unit 205 (227).

Figure 4:
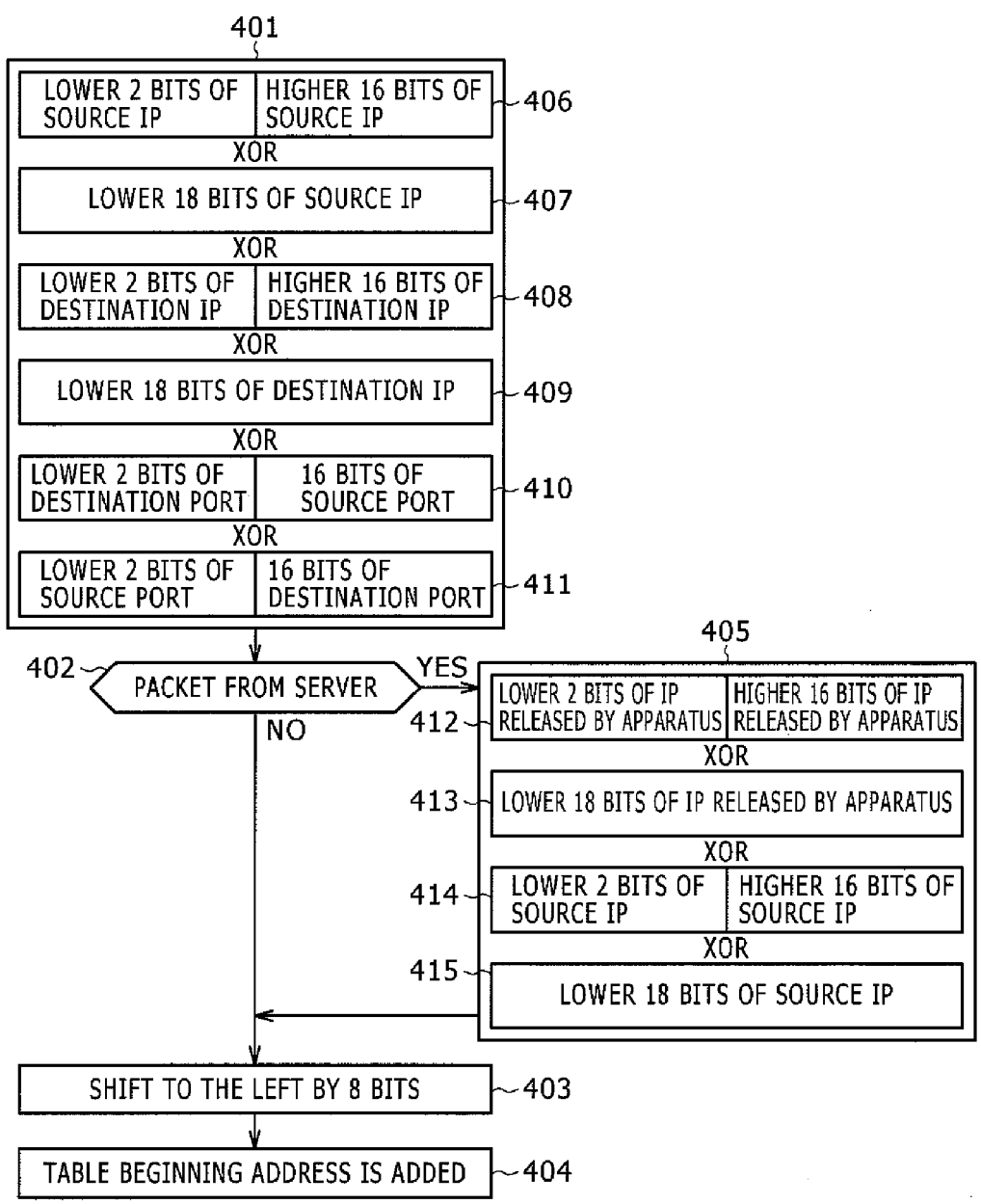
FIG. 4 is a flowchart for showing an address generating method of accessing the TCP/IP connection table mounted in the communication apparatus according to the embodiment of the present invention.

FIG. 4 shows an example of an address generating method when accessing the TCP/IP connection table 207.

In the first place, an XOR operation is performed using four field values (the source IP address SIP 2907, destination IP address DIP 2908, source TCP port number 2909, and destination TCP port number 2910) described in the packet header P.H. 2917 shown in FIG. 29 (Step 401). Next, it is determined whether or not the packet is one from the server (Step 402). If the packet is one from the server, an XOR operation using the source IP address SIP 2907 descried in the packet header P.H. 2917 and the IP address released by the apparatus (Step 405).

Finally, a bit shift operation (Step 403) and addition of a table beginning address (Step 404) are performed so as to generate a table address value.

Figure 5:
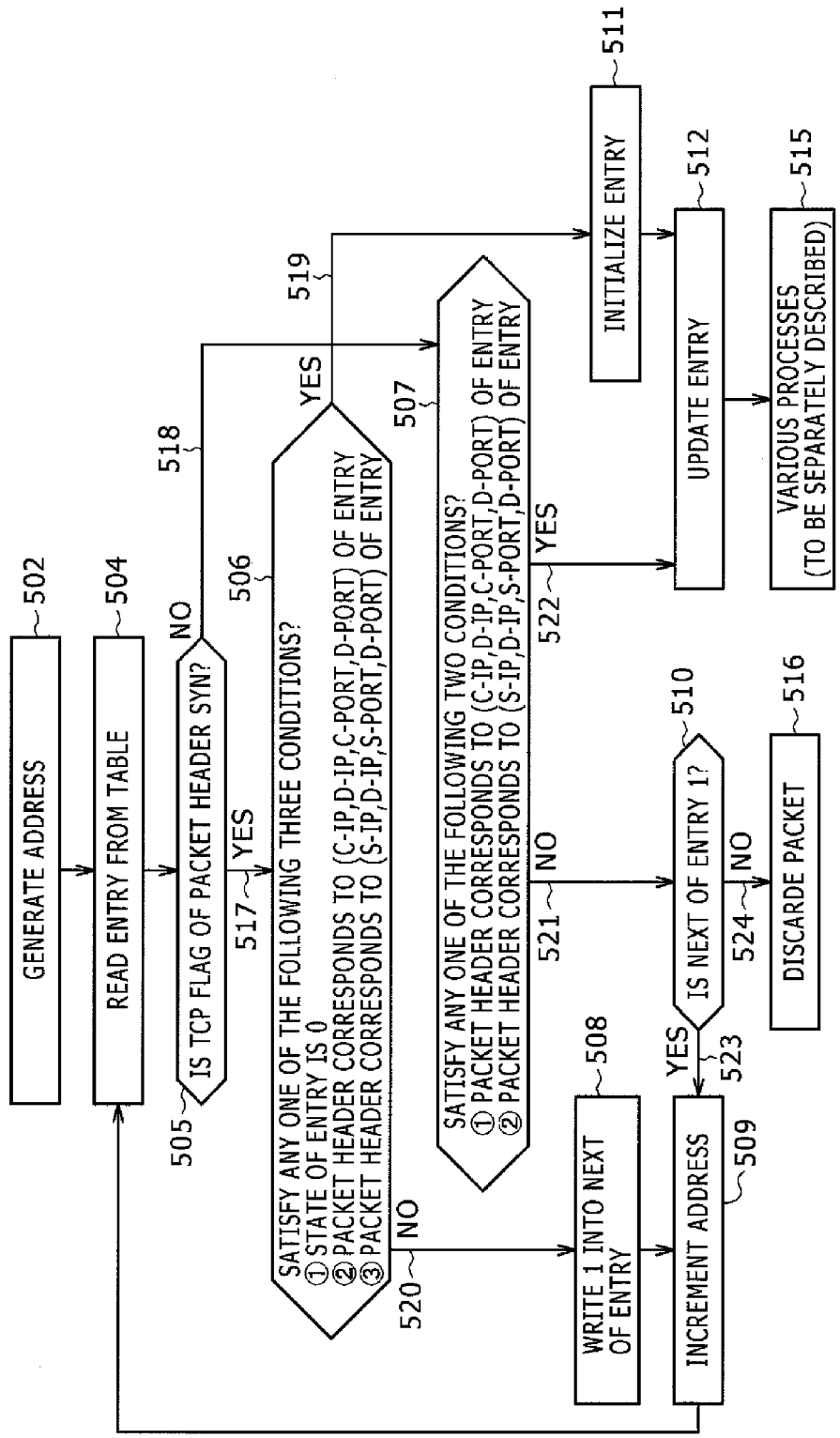
FIG. 5 is a flowchart for showing a method of accessing the TCP/IP connection table mounted in the communication apparatus according to the embodiment of the present invention.

FIG. 5 shows an example of an algorithm accessible to the TCP/IP connection table 207.

In the first place, an address is generated by the method shown in FIG. 4 (Step 502), and an entry is read from the TCP/IP connection table (Step 504) to determine whether or not the TCP Flag 2911 of the packet header is SYN (Step 505). If the TCP Flag 2911 is SYN in Step 505 (Step 517), it is determined whether or not any one of the followings is satisfied: the STATE 309 described in the entry is 0; the packet header P.H. 2917 corresponds to the C-IP 301, D-IP 302, C-PORT 303, and D-PORT 304 described in the entry; and the packet header P.H. 2917 corresponds to the S-IP 310, C-IP 311, S-PORT 312, and D-PORT 313 described in the entry (Step 506). If it is determined that one of them is satisfied in Step 506 (Step 519), the entry read in Step 504 is initialized (Step 511), the update time TIME 308 described in the entry is updated to the current time (Step 512), and various processes are performed for the packet (Step 515). If it is determined that none of them is satisfied in Step 506 (Step 520), 1 indicating a conflict of the hash value is written into the NEXT 317 of the entry read in Step 504 (Step 508). After the address value is incremented (Step 509), the flow returns to Step 504 to read the entry again using the address value incremented. If the TCP Flag 2911 is not SYN in Step 505 (Step 518), it is determined whether or not any one of the followings is satisfied: the packet header P.H. 2917 corresponds to the C-IP 301, D-IP 302, C-PORT 303, and D-PORT 304 described in the entry; and the packet header P.H. 2917 corresponds to S-IP 310, C-IP 311, S-PORT 312, and D-PORT 313 described in the entry (Step 507). If it is determined that any one of them is satisfied in Step 507 (Step 522), the update time TIME 308 of the entry read in Step 504 is updated to the current time (Step 512), and various processes are performed for the packet (Step 515). If it is determined that none of them is satisfied in Step 507 (Step 521), it is determined whether or not the NEXT of the entry read in Step 504 is 1 (Step 510). If it is determined that the NEXT is 1 in Step 510 (Step 523), the address value is incremented (Step 509), and then, the flow returns to Step 504 to read the entry again using the address value incremented. If it is determined that the NEXT is not 1 in Step 510 (Step 524), the packet is discarded and the flow is completed (Step 516).

Figure 7:
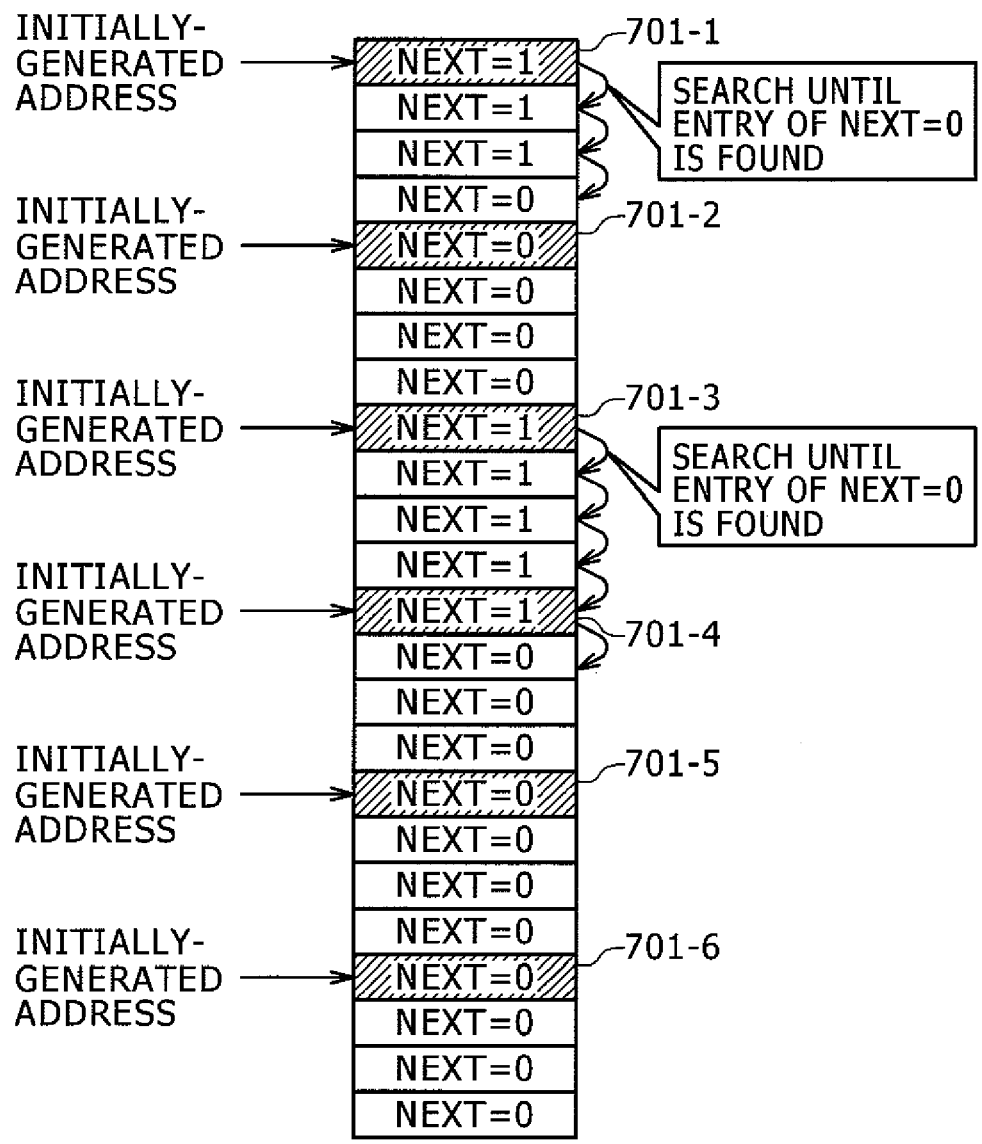
FIG. 7 is an explanation diagram for showing a searching method of a conflict of a hash value in the TCP/IP connection table according to the embodiment of the present invention.

By using the method for accessing the TCP/IP connection table 207 described using FIG. 4 and FIG. 5, an access method shown in, for example, FIG. 7 can be realized.

In FIG. 7, the address value generated using FIG. 4 is generated every four entries (701-1 to 701-6). When NEXT=0, the entry is initialized for use. When NEXT=1, entries are continuously read while shifting back to the previous entries one by one until the entry with NEXT=0 is found. The above method enables the use of all entries of the table, and it is possible to promptly search for the target entry even in a sate where the usage rate of entries of the table is high (about 90%).

As shown in FIG. 2, the TCP/HTTP processing unit 203 includes a restructuring unit 212, a state transition determination unit 211, an HTTP processing unit 210, a packet generating unit 209, and a TCP state updating unit 208.

Figure 8:
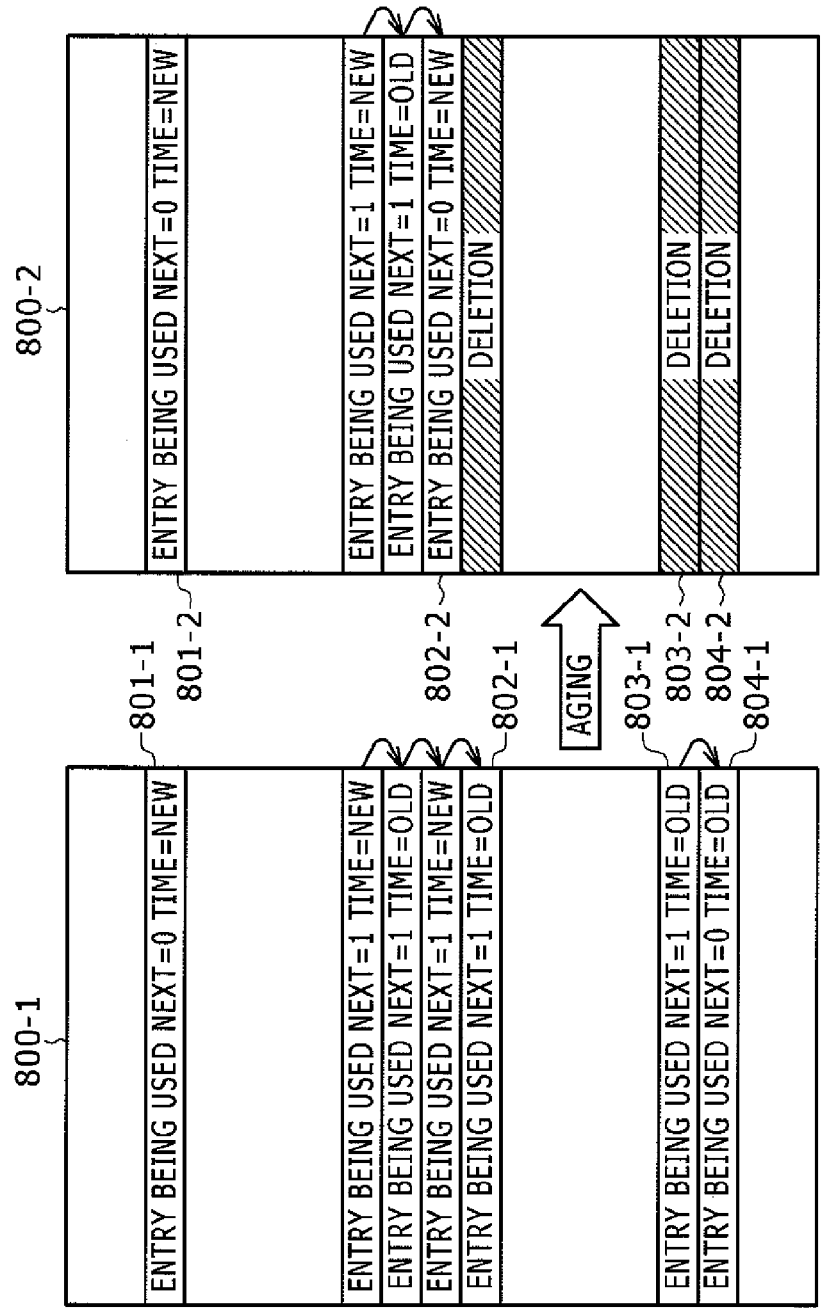
FIG. 8 is an explanation diagram for showing an aging method in the TCP/IP connection table according to the embodiment of the present invention.

FIG. 8 shows a method of deleting (aging) old entries. A table 800-1 shows a state before deleting (aging), and a table 800-2 shows a state after deleting (aging).

When the NEXT 317 described in the entry is 0, no conflict of the hash value is present, and the update time TIME 308 is much older than the current time, all the values of 0 described in the entry are cleared for deleting the entry. Further, when the NEXT 317 of the previous entry is 1, 1 is changed to 0.

The restructuring unit 212 (FIG. 2) receives a TCP state 220 updated by the TCP/IP connection managing unit, and restructures a circuit configuration of the TCP/HTTP processing unit on the basis of the TCP state 220. This is used for a case in which a dynamic restructuring processor or the like is used.

The state transition determination unit 211 (FIG. 2) determines the state transition of the TCP on the basis of a TCP state 221 updated by the TCP/IP connection managing unit and packet data 222 transmitted from the TCP/IP connection managing unit. The determined state transition of the TCP is transmitted to the TCP state updating unit 208, the packet generating unit 209, and the HTTP processing unit 210 (216).

The TCP state updating unit 208 (FIG. 2) generates a new TCP state on the basis of a determination result 216 of the state transition of the TCP, and outputs the same to the TCP/IP connection managing unit 213 (218).

Figure 9:
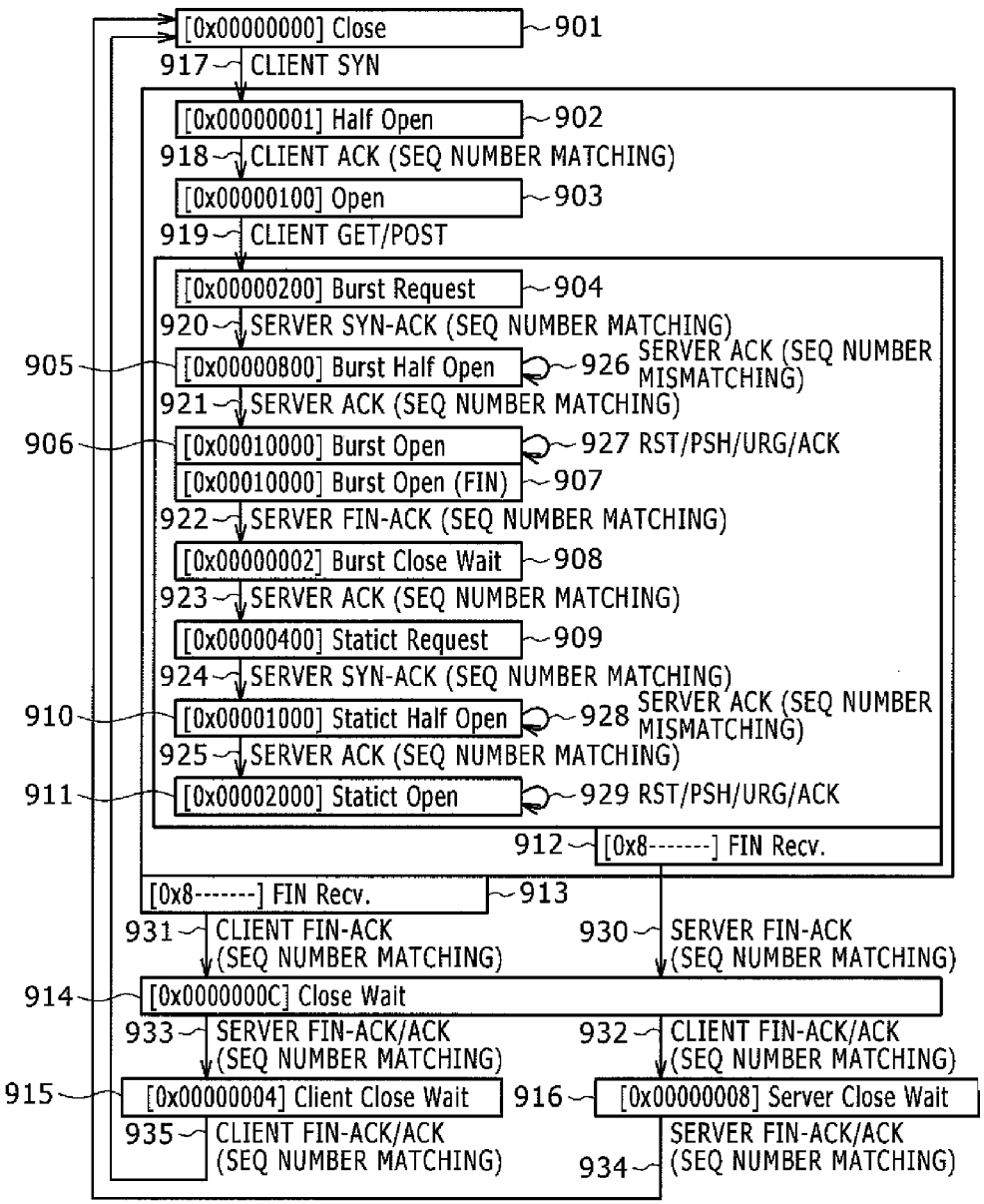
FIG. 9 is an explanation diagram for showing a TCP state transition according to the embodiment of the present invention.

FIG. 9 is a diagram for showing how the TCP state is transited by the state transition determination unit 211 and the TCP state updating unit 208. FIG. 9 shows a transition in the case of being used as the VOD distribution system in FIG. 6.

The initial state of the TCP state STATE 309 is a Close [value 0x00000000] 901 representing that the TCP connection has not been established. Upon receiving a packet in which the TCP Flag 2911 is SYN from the client in the state Close 901 (917), the state is transited to a state Half Open [value 0x00000001] 902 representing that the TCP connection is about to be established. Upon receiving a packet in which the TCP Flag 2911 is ACK and the PACK 2913 corresponds to the DC-SEQ 306 of the TCP/IP connection table 207 from the client in the state Half Open 902 (918), the state is transited to a state Open [value 0x00000100] 903 representing that the TCP connection has been established. Upon receiving a packet in which a GET or POST command of an HTTP protocol is described from the client in the state Open 903 (919), the state is transited to a state Burst Request [value 0x00000200] 904 representing that the TCP connection with the initial data transmission server has been started. Upon receiving a packet in which the TCP Flag 2911 is SYN-ACK and the PACK 2913 corresponds to the DS-SEQ 315 of the TCP/IP connection table 207 from the server in the state Burst Request 904 (920), the state is transited to a state Burst Half Open [value 0x00000800] 905 representing that the TCP connection with the initial data transmission server is about to be established. Upon receiving a packet in which the TCP Flag 2911 is ACK and the PACK 2913 does not correspond to the DS-SEQ 315 of the TCP/IP connection table 207 from the server in the state Burst Half Open 905 (926), the state is transited to the state Burst Half Open [value 0x00000800] 905 again. Upon receiving a packet in which the TCP Flag 2911 is ACK and the PACK 2913 corresponds to the DS-SEQ 315 of the TCP/IP connection table 207 from the server in the state Burst Half Open 905 (921), the state is transited to a state Burst Open [value 0x00010000] 906 representing that the TCP connection with the initial data transmission server has been established (921). Upon receiving a packet in which the TCP Flag 2911 is RST/PSH/URG/ACK from the server or the client in the state Burst Open 906 (927), the state is transited to the state Burst Open [value 0x00010000] 906 again (927).

Upon receiving a packet in which the TCP Flag 2911 is FIN from the server in the state Burst Open 906 (922), the state becomes a state Burst Close Wait [value 0x00000002] 908 representing that the TCP connection with the initial data transmission server is about to end via a state Burst Open (FIN) [value 0x80010000] 907 representing that the FIN has been received. Upon receiving a packet in which the TCP Flag 2911 is ACK and the PACK 2913 corresponds to the DS-SEQ 315 of the TCP/IP connection table 207 from the server in the state Burst Close Wait 908 (923), the state is transited to a state Static Request [value 0x00000400] 909 representing that the TCP connection with the subsequent data transmission server has been started. Upon receiving a packet in which the TCP Flag 2911 is SYN-ACK and the PACK 2913 corresponds to the DS-SEQ 315 of the TCP/IP connection table 207 from the server in the state Static Request 909 (924), the state is transited to a state Static Half Open [value 0x00001000] 910 representing that the TCP connection with the subsequent data transmission server is about to be established. Upon receiving a packet in which the TCP Flag 2911 is ACK and the PACK 2913 does not correspond to the DS-SEQ 315 of the TCP/IP connection table 207 from the server in the state Static Half Open 910 (928), the state is transited to the state Static Half Open 910 again. Upon receiving a packet in which the TCP Flag 2911 is ACK and the PACK 2913 corresponds to the DS-SEQ 315 of the TCP/IP connection table 207 from the server in the state Static Half Open 910 (925), the state is transited to a state Static Open [value 0x00020000] 911 representing that the TCP connection with the subsequent data transmission server has been established (925). Upon receiving a packet in which the TCP Flag 2911 is RST/PSH/URG/ACK from the server or the client in the state Static Open 911 (929), the state is transited to the state Static Open 911 again (929). Upon receiving a packet in which the TCP Flag 2911 is FIN-ACK and the PACK 2913 corresponds to the DC-SEQ 306 of the TCP/IP connection table 207 from the client in a state after the state Half Open (931), the state becomes a state Close Wait [value 0x0000000C] 914 representing that the termination of the TCP connection has been started via a state FIN Recv. [value 0x8------- (- is an arbitrary value)] 913 representing that the FIN has been received. Upon receiving a packet in which the TCP Flag 2911 is FIN-ACK and the PACK 2913 corresponds to the DS-SEQ 315 of the TCP/IP connection table 207 in a state after the state Burst Request (930), the state becomes a state Close Wait [value 0x0000000C] 914 representing that the termination of the TCP connection has been started via a FIN Recv. [value 0x8------- (- is an arbitrary value)] 912 representing that the FIN has been received. Upon receiving a packet in which the TCP Flag 2911 is FIN-ACK/ACK and the PACK 2913 corresponds to the DS-SEQ 315 of the TCP/IP connection table 207 from the server in the state Close Wait 914 (933), the state is transited to a state Client Close Wait [value 0x00000004] 915 representing that the TCP connection is about to end. Upon receiving a packet in which the TCP Flag 2911 is FIN-ACK/ACK and the PACK 2913 corresponds to the DC-SEQ 306 of the TCP/IP connection table 207 from the client in the state Close Wait 914 (932), the state is transited to a state Server Close Wait [value 0x00000008] 916 representing that the TCP connection is about to end. Upon receiving a packet in which the TCP Flag 2911 is FIN-ACK/ACK and the PACK 2913 corresponds to the DC-SEQ 306 of the TCP/IP connection table 207 from the client in the state Client Close Wait 915 (935), the state is transited to the state Close 901. Upon receiving a packet in which the TCP Flag 2911 is FIN-ACK/ACK and the PACK 2913 corresponds to the DS- SEQ 315 of the TCP/IP connection table 207 in the state Server Close Wait 916 (934), the state is transited to the Close 901.

As described above, the TCP state is transited in the state transition determination unit 211 and the TCP state updating unit 208. The TCP connection is established between the dedicated server and the apparatus 100 by the state transition after the instruction of reproduction from the client, and data corresponding to a threshold value for starting reproduction of the reception buffer is transmitted from the dedicated server in a broad band. Thereafter, the TCP connection is switched between the normal server and the apparatus 100, and the subsequent data can be transmitted from the normal server in a normal distribution band. Accordingly, it is not necessary for each server to be provided with a throughput performance for high-speed reproduction.

On the basis of the packet data 222 received from the TCP/IP connection managing unit 213 and the determination result 216 of the state transition of the TCP, the HTTP processing unit 210 (FIG. 2) analyzes an HTTP command described in the packet, or records an HTTP command into the file access request temporarily-recording table (223), or reads an HTTP command from the file access request temporarily-recording table (223). The analysis result and the read file access request are output to the packet generating unit 209 (217).

On the basis of the analysis result and the file access request output from the HTTP processing unit 210 and the determination result 216 of the state transition output from the state transition determination unit 211, the packet generating unit 209 (FIG. 2) generates a new packet to be output to the TCP/IP connection managing unit 213 (219). Further, the header portion of the generated packet is output to the TCP state updating unit 208 (233).

Figure 10:
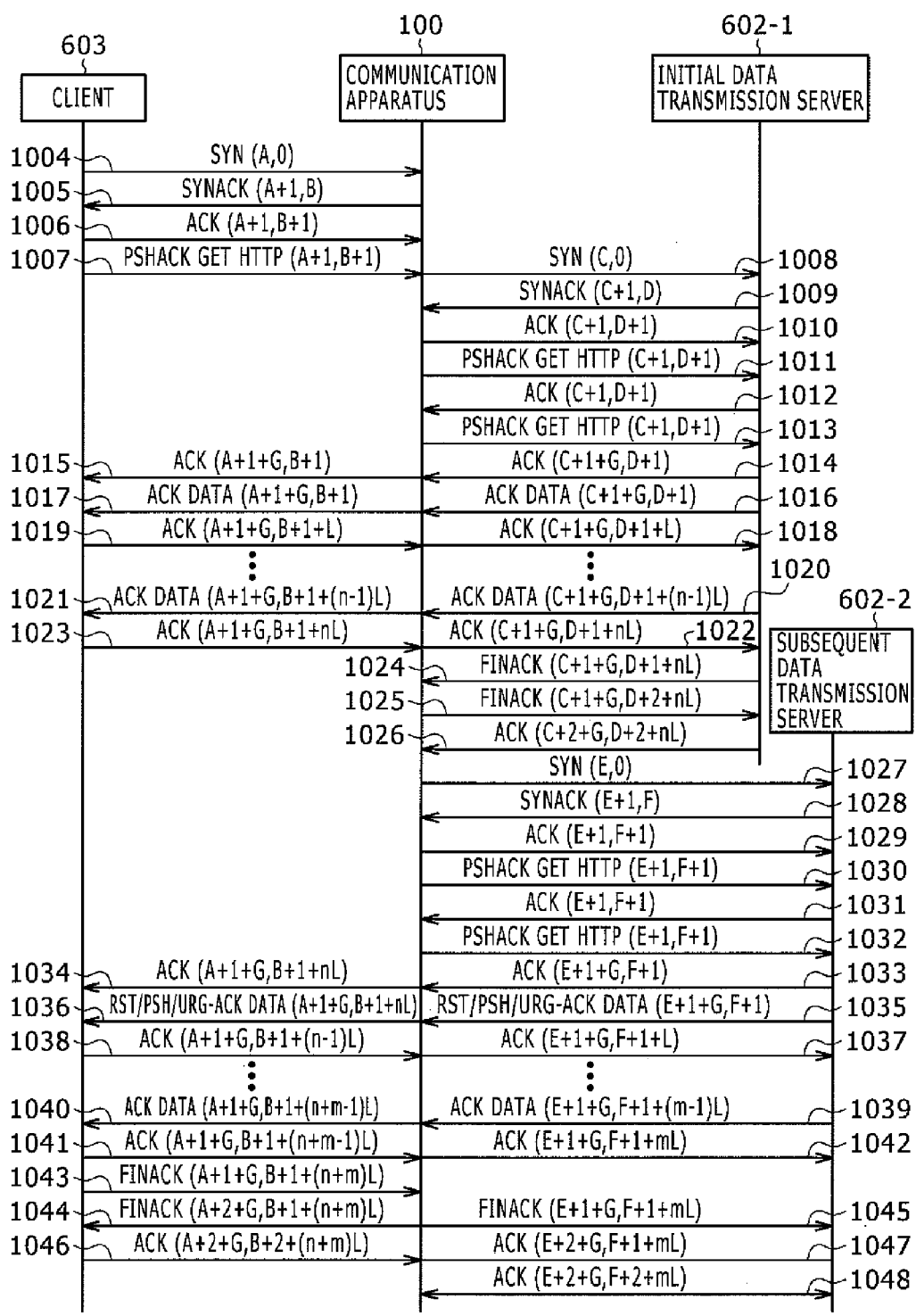
FIG. 10 is an explanation diagram of packets transmitted and received among the communication apparatus, clients, and servers according to the embodiment of the present invention.

FIG. 10 is a diagram showing the types of packets transmitted and received among the communication apparatus 100, a server 602, and a client 603 by the HTTP processing unit 210 and the packet generating unit 209. FIG. 10 shows a case in the VOD distribution system of FIG. 6.

The client 603 transmits a packet 1004 in which the TCP Flag 2911 is SYN, the PSEQ 2912 is A, and the PACK 2913 is 0 to the communication apparatus 100. Upon receiving the packet 1004, the communication apparatus 100 changes the TCP state STATE, the C-SEQ 305, and the DC-SEQ 306 of the TCP/IP connection table 207 into the Half Open, A+1, and B (random value)+1, respectively, and returns a packet 1005 in which the TCP Flag 2911 is SYN-ACK, the PSEQ 2912 is B, and the PACK 2913 is A+1 to the client 603. Upon receiving the packet 1005, the client 603 transmits a packet 1006 in which the TCP Flag 2911 is ACK, the PSEQ 2912 is A+1, and the PACK 2913 is B+1 to the communication apparatus 100. Upon receiving the packet 1006, the communication apparatus 100 changes the TCP state STATE of the TCP/IP connection table 207 into the Open. Accordingly, the TCP connection is established between the client 603 and the communication apparatus 100.

After transmitting the packet 1006, the client 603 transmits a packet 1007 in which the TCP Flag 2911 is PSH-ACK, the PSEQ 2912 is A+1, the PACK 2913 is B+1, and GET is described as a command of an HTTP protocol to the communication apparatus 100. Upon receiving the packet 1007, the communication apparatus 100 changes the TCP state STATE, the C-SEQ 305, the S-SEQ 314, and the DS-SEQ 315 of the TCP/IP connection table 207 into the Burst Request, A+1+G (the payload length of the packet 1007), 0, and C (random value)+1, respectively, and transmits a packet 1008 in which the TCP Flag 2911 is SYN, the PSEQ 2912 is C, and the PACK 2913 is 0 to the initial data transmission server 602-1. Further, the payload data included in the packet 1007 is recorded into the file access request temporarily-recording table 206, and the recorded beginning address is written into the POINTER 318 of the TCP/IP connection table 207. Upon receiving the packet 1008, the initial data transmission server 602-1 transmits a packet 1009 in which the TCP Flag 2911 is SYN-ACK, the PSEQ 2912 is D (random value), and the PACK 2913 is C+1. Upon receiving the packet 1009, the communication apparatus 100 changes the TCP state STATE, the S-SEQ 314, and the DS-SEQ 315 of the TCP/IP connection table 207 into the Burst Half Open, D+1, and C+1+G (the payload length of the packet 1007), respectively, and transmits a packet 1010 in which the TCP Flag 2911 is ACK, the PSEQ 2912 is C+1, and the PACK 2913 is D+1 to the initial data transmission server 602-1. Accordingly, the TOP connection is established between the communication apparatus 100 and the initial data transmission server 602.

After transmitting the packet 1010, the communication apparatus 100 transmits, to the initial data transmission server 602-1, a packet 1011 in which the TCP Flag 2911 is PSH-ACK, the PSEQ 2912 is C+1, and the PACK 2913 is D+1 while data (the payload data included in the packet 1007) read from the file access request temporarily-recording table 206 using the POINTER 318 of the TCP/IP connection table 207 as the beginning address is used as the payload. If the initial data transmission server 602-1 cannot correctly receive the packet 1011, the initial data transmission server 602-1 transmits a packet 1012 in which the TCP Flag 2911 is ACK, the PSEQ 2912 is D+1, and the PACK 2913 is C+1. Upon receiving the packet 1012, the communication apparatus 100 transmits a packet 1013 which is the same as the packet 1011 to the initial data transmission server 602-1. If the initial data transmission server 602-1 correctly receives the packet 1011 or the packet 1013, the initial data transmission server 602-1 transmits a packet 1014 in which the TCP Flag 2911 is ACK, the PSEQ 2912 is D+1, and the PACK 2913 is C+1+G (the payload lengths of the packets 1007, 1011 and 1013). Upon receiving the packet 1014, the communication apparatus 100 changes the TCP state STATE of the TCP/IP connection table 207 into the Burst Open, and transmits a packet 1015 in which the PSEQ 2912 and the PACK 2913 were changed into B+1 and A+1+G, respectively, to the client 603. Accordingly, the initial data transmission server 602 is ready for broadband transmission of data towards the client 603.

After transmitting the packet 1014, the initial data transmission server 602-1 starts to transmit data corresponding to a threshold value for starting reproduction of the reception buffer. The initial data transmission server 602-1 transmits a packet 1016 in which data (length L) is included as the payload, the TCP Flag 2911 is ACK, the PSEQ 2912 is D+1, and the PACK 2913 is C+1+G. Upon receiving the packet 1016, the communication apparatus 100 changes the S-SEQ 314 and the DC-SEQ 306 of the TCP/IP connection table 207 into D+1+L and B+1L, respectively, and transmits a packet 1017 in which the TCP Flag 2911 is ACK, the PSEQ 2912 is B+1, and the PACK 2913 is A+1+G to the client 603. Upon receiving the packet 1017, the client 603 transmits a packet 1019 in which the TCP Flag 2911 is ACK, the PSEQ 2912 is A+1+G, and the PACK 2913 is B+1+L to the communication apparatus 100. Upon receiving the packet 1019, the communication apparatus 100 transmits a packet 1018 in which the PSEQ 2912 and the PACK 2913 were changed into C+1+G and D+1+L, respectively, to the initial data transmission server 602-1. Thereafter, the data corresponding to the threshold value for starting reproduction of the reception buffer is continuously transmitted from the initial data transmission server 602-1 to the client 603. Finally, the initial data transmission server 602-1 transmits a packet 1020 in which the TCP Flag 2911 is ACK, the PSEQ 2912 is D+1+(n−1)L, and the PACK 2913 is C+1+G to the communication apparatus 100. Upon receiving the packet 1020, the communication apparatus 100 changes the S-SEQ 314 and the DC-SEQ 306 of the TCP/IP connection table 207 into D+1+nL and B+1+nL, respectively, and transmits a packet 1021 in which the PSEQ 2912 and the PACK 2913 were changed into B+1+(n−1)L and A+1+G, respectively, to the client 603. Upon receiving the packet 1021, the client 603 transmits a packet 1023 in which the TCP Flag 2911 is ACK, the PSEQ 2912 is A+1+G, and the PACK 2913 is B+1+nL to the communication apparatus 100. Upon receiving the packet 1023, the communication apparatus 100 transmits a packet 1022 in which the PSEQ 2912 and the PACK 2913 were changed into C+1+G and D+1+nL, respectively, to the initial data transmission server 602-1. Accordingly, transmission of data corresponding to the threshold value for starting reproduction of the reception buffer is completed.

Upon receiving the packet 1022, the initial data transmission server 602-1 transmits a packet 1024 in which the TCP Flag 2911 is FIN-ACK, the PSEQ 2912 is D+1+nL, and the PACK 2913 is C+1+G to the communication apparatus 100 for a request of disconnecting the TCP connection. Upon receiving the packet 1024, the communication apparatus 100 changes the S-SEQ 314 and the DS-SEQ 315 into D+2+nL and C+2+G, respectively, while changing the TCP state STATE of the TCP/IP connection table 207 into the Burst Close Wait via the Burst FIN Receive, and transmits a packet 1025 in which the TCP Flag 2911 is FIN-ACK, the PSEQ 2912 is C+1+G, and the PACK 2913 is D+2+nL to the initial data transmission server 602-1. Upon receiving the packet 1025, the initial data transmission server 602-1 transmits a packet 1026 in which the TCP Flag 2911 is ACK, the PSEQ 2912 is D+2+nL, and the PACK 2913 is C+2+G to the communication apparatus 100. Accordingly, the TCP connection between the communication apparatus 100 and the initial data transmission server 602-1 is disconnected.

Upon receiving the packet 1026, the communication apparatus 100 changes the TCP state STATE, the S-SEQ 314 and the DS-SEQ 315 of the TCP/IP connection table 207 into the Static Request, 0 and E (random value)+1, respectively, and transmits a packet 1027 in which the TCP Flag 2911 is SYN, the PSEQ 2912 is E, and the PACK 2913 is 0 to the subsequent data transmission server 602-2 for establishment of the TCP connection with the subsequent data transmission server 602-2. Upon receiving the packet 1027, the subsequent data transmission server 602-2 transmits a packet 1028 in which the TCP Flag 2911 is SYN-ACK, the PSEQ 2912 is F (random value), and the PACK 2913 is E+1. Upon receiving the packet 1028, the communication apparatus 100 changes the TCP state STATE, the S-SEQ 314, and the DS-SEQ 315 of the TCP/IP connection table 207 into the Static Half Open, F+1, and E+1+G (the payload length of the packet 1007), respectively, and transmits a packet 1029 in which the TCP Flag 2911 is ACK, the PSEQ 2912 is E+1, and the PACK 2913 is F+1 to the subsequent data transmission server 602-2. Accordingly, the TCP connection between the communication apparatus 100 and the subsequent data transmission server 602-2 is established.

After transmitting the packet 1029, the communication apparatus 100 transmits, to the subsequent data transmission server 602-2, a packet 1030 in which the TCP Flag 2911 is PSH-ACK, the PSEQ 2912 is E+1, the PACK 2913 is F+1 while data (the payload data included in the packet 1007) read from the file access request temporarily-recording table 206 using the POINTER 318 of the TCP/IP connection table 207 as the beginning address is used as the payload. If the subsequent data transmission server 602-2 cannot correctly receive the packet 1030, the subsequent data transmission server 602-2 transmits a packet 1031 in which the TCP Flag 2911 is ACK, the PSEQ 2912 is F+1, and the PACK 2913 is E+1. Upon receiving the packet 1031, the communication apparatus 100 transmits a packet 1032 which is the same as the packet 1030 to the subsequent data transmission server 602-2. If the subsequent data transmission server 602-2 correctly receives the packet 1030 or the packet 1032, the subsequent data transmission server 602-2 transmits a packet 1033 in which the TCP Flag 2911 is ACK, the PSEQ 2912 is F+1, and the PACK 2913 is E+1+G. Upon receiving the packet 1033, the communication apparatus 100 changes the TCP state STATE of the TCP/IP connection table 207 into the Static Open, and transmits a packet 1034 in which the PSEQ 2912 and the PACK 2913 were changed into B+1+nL and A+1+G, respectively, to the client 603. Accordingly, the subsequent data transmission server 602-2 is ready for data transmission in a normal distribution band towards the client 603.

After transmitting the packet 1033, the subsequent data transmission server 602-2 starts to transmit data subsequent to the data transmitted by the initial data transmission server 602-1. The subsequent data transmission server 602-2 transmits a packet 1035 in which data (length L) is included as the payload, the TCP Flag 2911 is ACK, the PSEQ 2912 is F+1, and the PACK 2913 is E+1+G. Upon receiving the packet 1035, the communication apparatus 100 changes the S-SEQ 314 and the DC-SEQ 306 of the TCP/IP connection table 207 into F+1+L and B+1+(n+1)L, respectively, and transmits a packet 1036 in which the TCP Flag 2911 is ACK, the PSEQ 2912 is B+1+nL, and the PACK 2913 is A+1+G to the client 603. Upon receiving the packet 1036, the client 603 transmits a packet 1038 in which the TCP Flag 2911 is ACK, the PSEQ 2912 is A+1+G, and the PACK 2913 is B+1+(n+1)L to the communication apparatus 100. Upon receiving the packet 1038, the communication apparatus 100 transmits a packet 1037 in which the PSEQ 2912 and the PACK 2913 were changed into E+1+G and F+1+L, respectively, to the subsequent data transmission server 602-2. Thereafter, data is continuously transmitted from the subsequent data transmission server 602-2 to the client 603. Finally, the subsequent data transmission server 602-2 transmits a packet 1039 in which the TCP Flag 2911 is ACK, the PSEQ 2912 is F+1+(m−1)L, and the PACK 2913 is E+1+G to the communication apparatus 100. Upon receiving the packet 1039, the communication apparatus 100 changes the S-SEQ 314 and the DC-SEQ 306 of the TCP/IP connection table 207 into F+1+mL and B+1+(m+n)L, respectively, and transmits a packet 1040 in which the PSEQ 2912 and the PACK 2913 were changed into B+1+(m+n−1)L and A+1+G, respectively, to the client 603. Upon receiving the packet 1040, the client 603 transmits a packet 1041 in which the TCP Flag 2911 is ACK, the PSEQ 2912 is A+1+G, and the PACK 2913 is B+1+(m+n)L to the communication apparatus 100. Upon receiving the packet 1041, the communication apparatus 100 transmits a packet 1042 in which the PSEQ 2912 and the PACK 2913 were changed into E+1+G and F+1+mL, respectively, to the subsequent data transmission server 602-2. Accordingly, transmission of data is completed.

Finally, the client 603 transmits a packet 1043 in which the TCP Flag 2911 is FIN-ACK, the PSEQ 2912 is A+1+G, and the PACK 2913 is B+1+(m+n)L to the communication apparatus 100. The communication apparatus 100 changes the DS-SEQ 315, the DC-SEQ 306, and the C-SEQ 305 of the TCP/IP connection table 207 into E+2+G, B+2+(m+n)L, A+2+G, respectively, transmits a packet 1044 in which the TCP Flag 2911 is FIN-ACK, the PSEQ 2912 is B+1+(m+n)L, and the PACK 2913 is A+2+G to the client 603, and transmits a packet 1045 in which the TCP Flag 2911 is FIN-ACK, the PSEQ 2912 is E+1+G, and the PACK 2913 is F+1+mL to the subsequent data transmission server 602-2. Upon receiving the packet 1044, the client 603 transmits a packet 1046 in which the TCP Flag 2911 is ACK, the PSEQ 2912 is A+2+G, and the PACK 2913 is B+2+(m+n)L to the communication apparatus 100. Upon receiving the packet 1045, the subsequent data transmission server 602-2 transmits a packet 1047 in which the TCP Flag 2911 is FIN-ACK, the PSEQ 2912 is F+1+mL, and the PACK 2913 is E+2+G to the communication apparatus 100. Upon receiving the packet 1047, the communication apparatus 100 changes the S-SEQ 314 of the TCP/IP connection table 207 into F+2+mL, and transmits a packet 1048 in which the PSEQ 2912 and the PACK 2913 were changed into E+2+G and F+2+mL, respectively, to the subsequent data transmission server 602-2. Accordingly, the TCP connection between the client 603 and the communication apparatus 100 and the TCP connection between the communication apparatus 100 and the subsequent data transmission server 602-2 are terminated.

As described above, the packets are transmitted and received among the communication apparatus 100, the server 602, and the client 603 by the HTTP processing unit 210 and the packet generating unit 209.

There is realized a broadband transmission module for reproduction with a device by which through transmission and reception of the packets, data corresponding to a threshold value for starting reproduction of the reception buffer is transmitted from the dedicated server in a broad band immediately after the data reproducing software instructs to reproduce the data, and then, the subsequent data is transmitted from the normal server in a normal distribution band.

Figure 11:
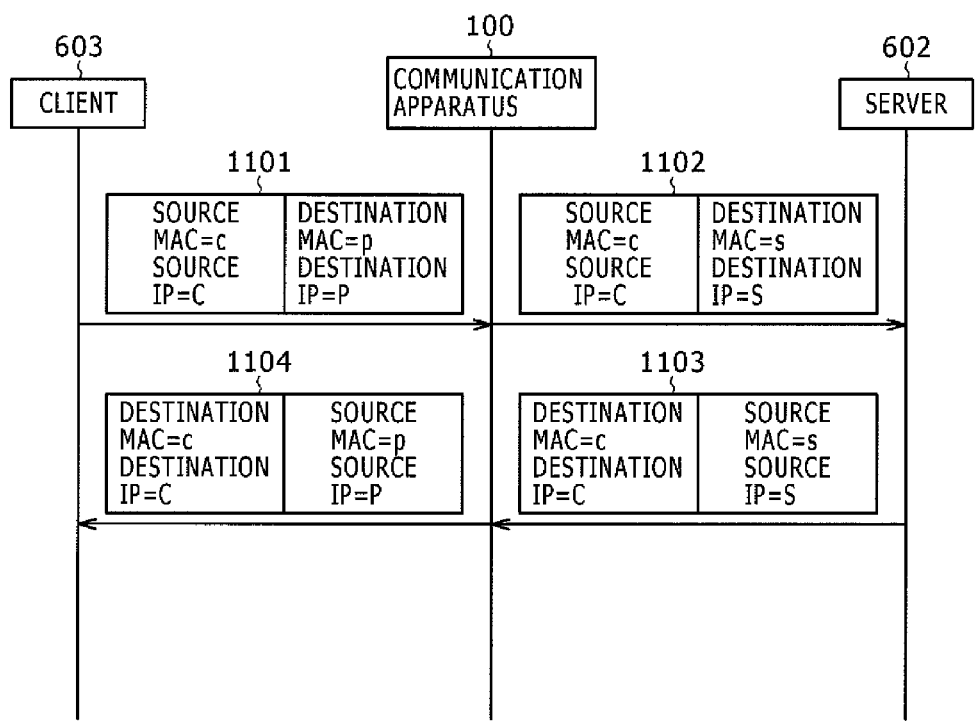
FIG. 11 is an explanation diagram of packet headers transmitted and received among the communication apparatus, clients, and servers according to the embodiment of the present invention.

FIG. 11 shows a source MAC address, a source IP address, a destination MAC address, and a destination IP address of each packet transmitted and received among the communication apparatus 100, the server 602, and the client 603.

Between the client 603 and the communication apparatus 100, communications are performed using a MAC address c and an IP address C of the client 603, and a MAC address p and an IP address P released by the communication apparatus 100 to the client side. The MAC address and the IP address of each packet transmitted and received between the client 603 and the communication apparatus 100 are shown as a packet 1101 and a packet 1104.

Between the server 602 and the communication apparatus 100, communications are performed using the MAC address c and the IP address C of the client 603, and a MAC address s and an IP address S of the server 602. The MAC address and the IP address of each packet transmitted and received between the server 602 and the communication apparatus 100 are shown as a packet 1102 and a packet 1103.

It should be noted that since it is assumed that the communication apparatus 100 is used in a system where plural servers 602 are present as shown in FIG. 1, the packet generating unit 209 is provided with a device for selecting one of the MAC addresses s and the IP addresses S of plural servers 602.

FIG. 12 shows a first example of the device for selecting one of the IP addresses of plural servers 602. The MAC address is selected by the similar device.

The packet generating unit 209 includes a memory 1203 in which an IP address of the initial data transmission server is recorded. When the communication apparatus 100 receives the packet (the packet 1007 of FIG. 10) including a command for requesting a file and transmits the SYN packet (the packet 1008 of FIG. 10) to the initial data transmission server, first letters (8 bits) 1201 of a requested file name are input to the memory 1203 as an input address, and output data is selected as an IP address 1204 of the initial data transmission server.

Further, the packet generating unit 209 includes a memory 1207 in which an IP address of the subsequent data transmission server is recorded. When the communication apparatus 100 receives the packet (for example, the packet 1026 of FIG. 10) for terminating the TCP connection with the initial data transmission server and transmits the SYN packet (the packet 1027 of FIG. 10) to the subsequent data transmission server, first letters (8 bits) 1205 of a requested file name recorded in the file access request temporarily-recording table 206 are input to the memory 1207 as an input address, and output data is selected as an IP address 1208 of the subsequent data transmission server.

Figure 13:
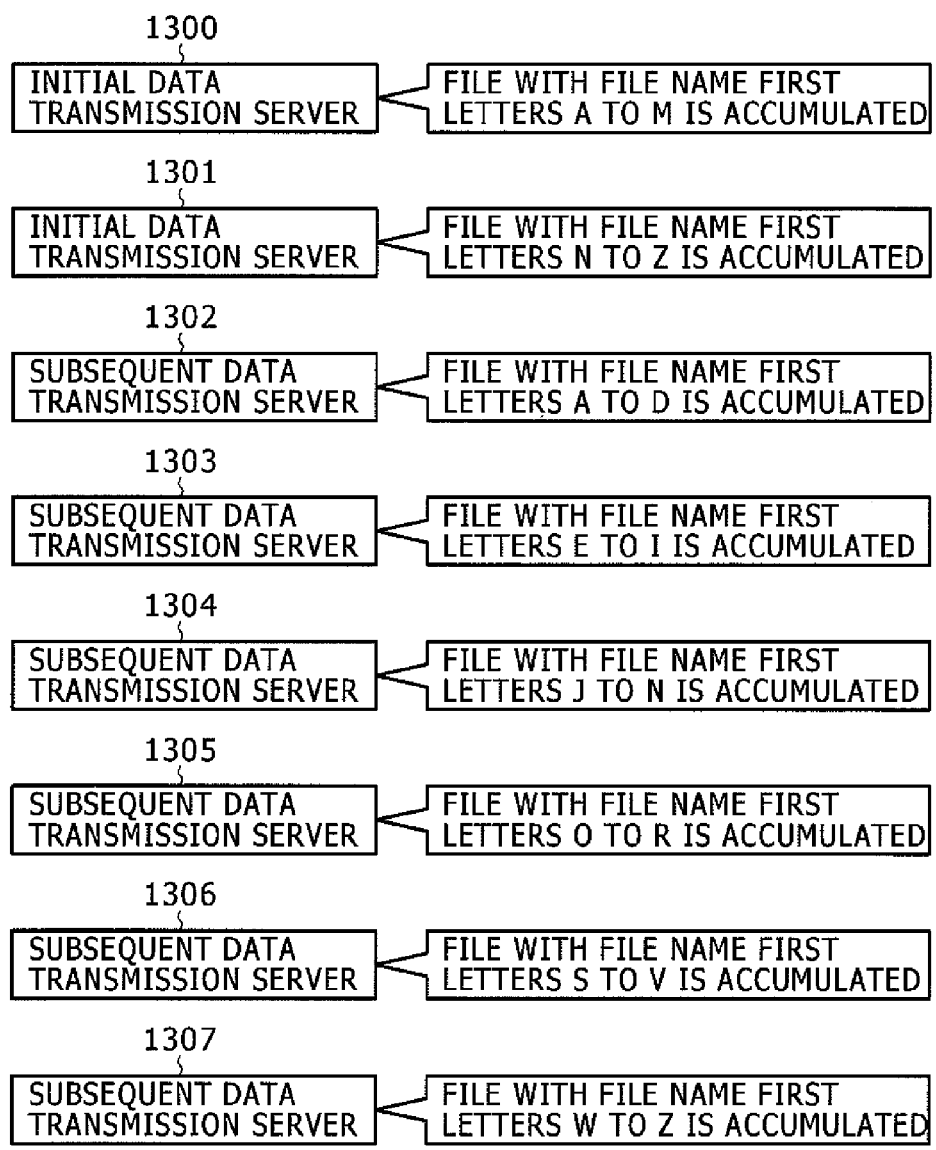
FIG. 13 is an explanation diagram of an example of a file accumulating method of the server according to the embodiment of the present invention.

FIG. 13 shows a method of accumulating files in the servers when the IP address and the MAC address of the server are selected using the device shown in FIG. 12.

In an initial data transmission server 1300, a file with file name first letters A to M is accumulated, and in an initial data transmission server 1301, a file with file name first letters N to Z is accumulated.

In a subsequent data transmission server 1302, a file with file name first letters A to D is accumulated. In a subsequent data transmission server 1303, a file with file name first letters E to I is accumulated. In a subsequent data transmission server 1304, a file with file name first letters J to N is accumulated. In a subsequent data transmission server 1305, a file with file name first letters O to R is accumulated. In a subsequent data transmission server 1306, a file with file name first letters S to V is accumulated. In a subsequent data transmission server 1307, a file with file name first letters W to Z is accumulated.

Although the first letters (8 bits) 1201 of the requested file name are used as an input address in the explanation related to FIG. 12 and FIG. 13, other letters of the requested file name or a letter string representing a directory path of the requested file can be used as an input address to the memory 1203.

FIG. 14 shows a second example of the device for selecting one of the IP addresses of plural servers 602. The MAC address is selected by the similar device.

The packet generating unit 209 includes a hash value generating circuit 1402 and a memory 1403 in which an IP address of the initial data transmission server is recorded. When the communication apparatus 100 receives the packet (the packet 1007 of FIG. 10) including a command for requesting a file and transmits the SYN packet (the packet 1008 of FIG. 10) to the initial data transmission server, information 1401 representing a requested file name, a directory path, or a letter string representing a part thereof is input to the hash value generating circuit 1402. Further, a hash value output from the hash value generating circuit 1402 is input to the memory 1403, and output data is selected as an IP address 1404 of the initial data transmission server.

Further, the packet generating unit 209 includes a hash value generating circuit 1406 and a memory 1407 in which an IP address of the subsequent data transmission server is recorded. When the communication apparatus 100 receives the packet (for example, the packet 1026 of FIG. 10) for terminating the TCP connection with the initial data transmission server and transmits the SYN packet (the packet 1027 of FIG. 10) to the subsequent data transmission server, information 1405 representing a requested file name, a directory path, or a letter string representing a part thereof is input to the hash value generating circuit 1406. Further, a hash value output from the hash value generating circuit 1406 is input to the memory 1407, and output data is selected as an IP address 1408 of the subsequent data transmission server.

Figure 15:
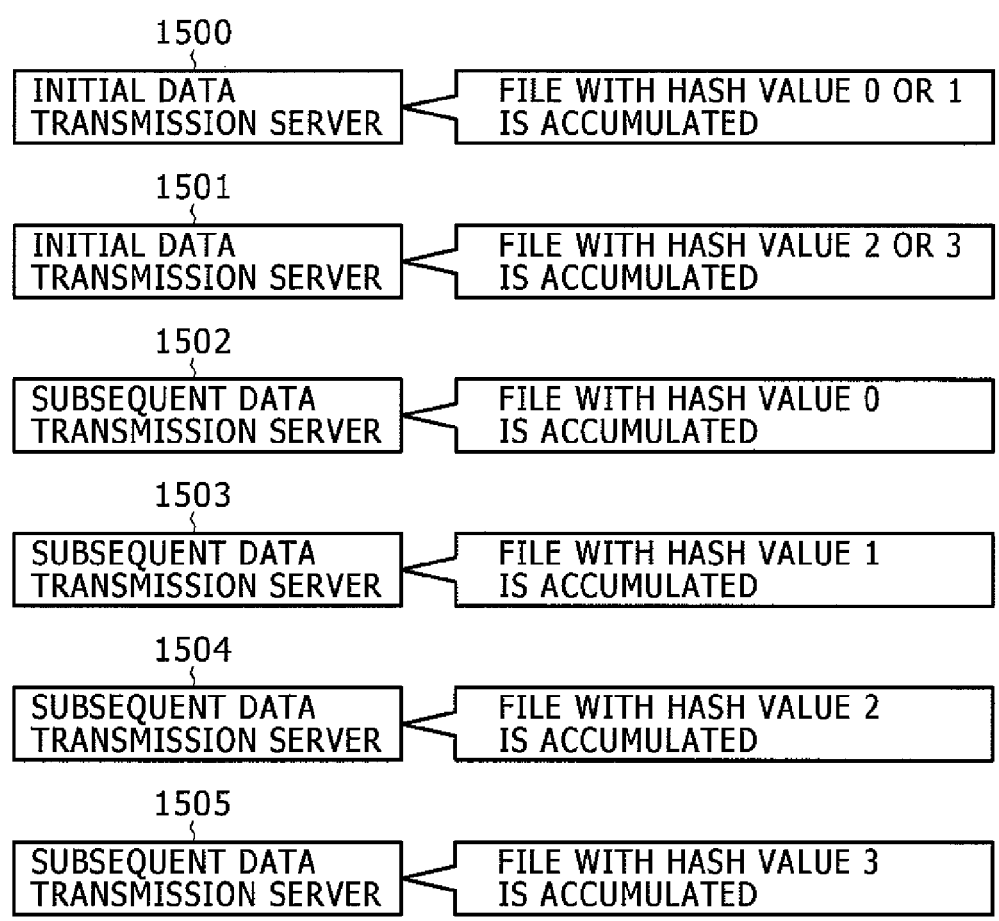
FIG. 15 is an explanation diagram of an example of a file accumulating method of the server according to the embodiment of the present invention.

FIG. 15 shows a method of accumulating files in the servers when the IP address and the MAC address of the server are selected using the device shown in FIG. 14.

In an initial data transmission server 1500, a file with a hash value 0 or 1 is accumulated using the device shown in FIG. 14, and in an initial data transmission server 1501, a file with a hash value 2 or 3 is accumulated using the device shown in FIG. 14.

In a subsequent data transmission server 1502, a file with a hash value 0 is accumulated using the device shown in FIG. 14. In a subsequent data transmission server 1503, a file with a hash value 1 is accumulated using the device shown in FIG. 14. In a subsequent data transmission server 1504, a file with a hash value 2 is accumulated using the device shown in FIG. 14. In a subsequent data transmission server 1505, a file with a hash value 3 is accumulated using the device shown in FIG. 14.

FIG. 16 shows a third example of the device for selecting one of the IP addresses of plural servers 602. The MAC address is selected by the similar device.

The packet generating unit 209 includes a memory 1603 in which an IP address of the initial data transmission server is recorded. When the communication apparatus 100 receives the packet (the packet 1007 of FIG. 10) including a command for requesting a file and transmits the SYN packet (the packet 1008 of FIG. 10) to the initial data transmission server, lower 8 bits 1601 of a client IP address are input to the memory 1603 as an input address, and output data is selected as an IP address 1604 of the initial data transmission server.

Further, the packet generating unit 209 includes a memory 1607 in which an IP address of the subsequent data transmission server is recorded. When the communication apparatus 100 receives the packet (for example, the packet 1026 of FIG. 10) for terminating the TCP connection with the initial data transmission server and transmits the SYN packet (the packet 1027 of FIG. 10) to the subsequent data transmission server, lower 8 bits 1605 of a client IP address are input to the memory 1607 as an input address, and output data is selected as an IP address 1608 of the subsequent data transmission server.

It should be noted that even if the client IP address is used, a selection device for IP addresses similar to that explained in relation to FIG. 14 and FIG. 15 can be realized. The client IP address or a part thereof is input into the hash value generating circuit 1402, a hash value output from the hash value generating circuit is input into the memory 1403 in which an IP address of the initial data transmission server is recorded, and output data is selected as an IP address of the initial data transmission server. Further, the client IP address, or a part thereof is input into the hash value generating circuit 1402, a hash value output from the hash value generating circuit is input into the memory 1407 in which an IP address of the subsequent data transmission server is recorded, and output data is selected as an IP address of the subsequent data transmission server.

FIG. 17 shows a fourth example of the device for selecting one of the IP addresses of plural servers 602. The MAC address is selected by the similar device.

The packet generating unit 209 includes a server load table 1701 containing n entries each of which records an IP address of an initial data transmission server and the number of TCP connections with the server, and a heap circuit 1702 which repeatedly performs an operation in which the numbers of TCP connections of adjacent entries are compared to each other to extract the entry with the smaller number and extracts the entry with the smallest number of the TCP connections. When receiving the packet (the packet 1007 of FIG. 10) including a command for requesting a file and transmitting the SYN packet (the packet 1008 of FIG. 10) to the initial data transmission server, the entry with the smallest number of TCP connections is extracted from the heap circuit 1702, and the IP address described in the entry is selected as an IP address of the initial data transmission server. After extraction, the number of TCP connections described in the entry is incremented and the heap circuit is updated (1703).

Further, the packet generating unit 209 includes a server load table 1704 containing n entries each of which records an IP address of a subsequent data transmission server and the number of TCP connections with the server, and a heap circuit 1705 which repeatedly performs an operation in which the numbers of TCP connections of adjacent entries are compared to each other to extract the entry with the smaller number and extracts the entry with the smallest number of the TCP connections. When receiving the packet (the packet 1026 of FIG. 10) including a command for requesting a file and transmitting the SYN packet (the packet 1027 of FIG. 10) to the initial data transmission server, the entry with the smallest number of TCP connections is extracted from the heap circuit 1705, and the IP address described in the entry is selected as an IP address of the subsequent data transmission server. After extraction, the number of TCP connections described in the entry is incremented and the heap circuit is updated (1706).

Figure 18:
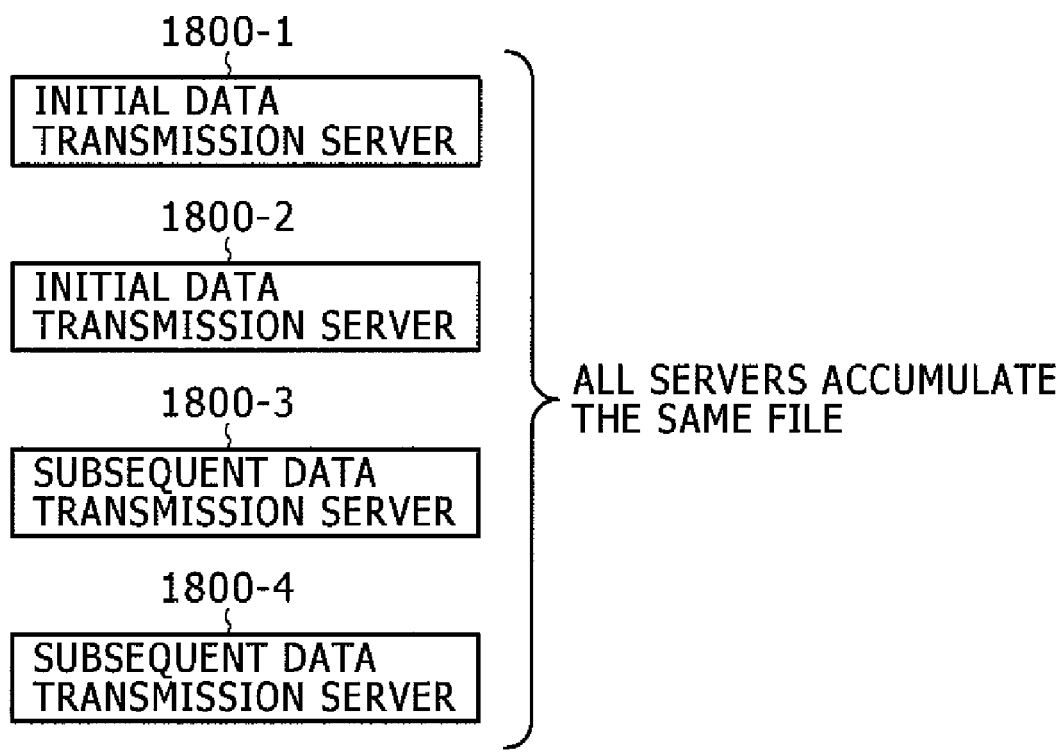
FIG. 18 is an explanation diagram of an example of a file accumulating method of the server according to the embodiment of the present invention.

FIG. 18 shows a method of accumulating files in the servers when the IP address and the MAC address of the server are selected using the device shown in FIG. 16 or FIG. 17.

All servers of initial data transmission servers 1800-1 and 1800-2 and subsequent data transmission server 1800-3 and 1800-4 accumulate the same file.

Figure 19:
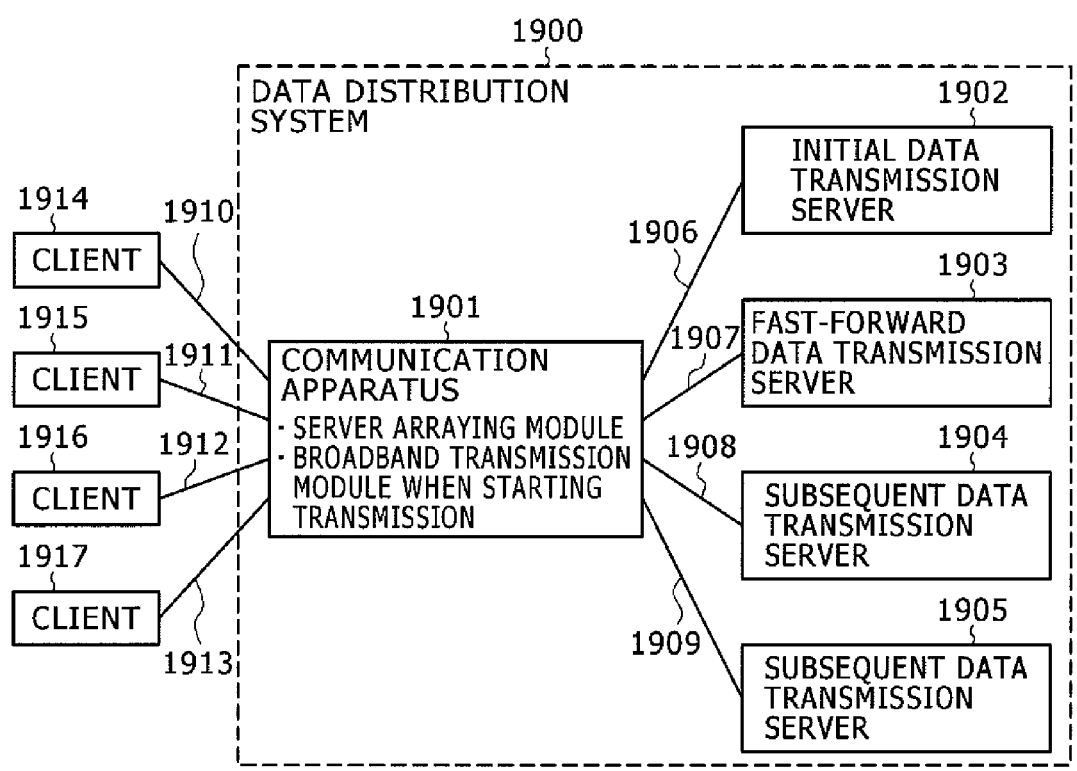
FIG. 19 is an explanation diagram of an extended example of the data distribution system according to the embodiment of the present invention.

As a fifth example of the device for selecting one of the IP addresses of plural servers 602, a server to be accessed may be selected in accordance with the content of a command. This method is used together with a system including an initial data transmission server 1902 and a fast-forward data transmission server 1903 as shown in, for example, FIG. 19.

When the communication apparatus 100 receives the packet (the packet 1007 of FIG. 10) including a command for requesting a file and transmits the SYN packet (the packet 1008 of FIG. 10) to the initial data transmission server, the IP address of the initial data transmission server 1902 is selected when the content of the command is a normal file access request, and the IP address of the fast-forward data transmission server 1903 is selected when the content of the command is a digest data request.

By using the server selecting methods shown in FIG. 12 and FIG. 14 and the file accumulating methods shown in FIG. 13 and FIG. 15, a file dispersion access module (a module for sorting a distribution request from a client into a server storing the file corresponding to the distribution request) can be realized. Further, by using the server selecting methods shown in FIG. 16 and FIG. 17 and the file accumulating method shown in FIG. 18, a load balancing module (a module for dispersing a distribution request from a client among plural servers accumulating the same file) can be realized.

Accordingly, it is possible to provide a communication apparatus which is provided with a server arraying module including the load balancing module (a module for dispersing a distribution request from a client among plural servers accumulating the same file) and the file dispersion access module (a module for sorting a distribution request from a client into a server storing the file corresponding to the distribution request) and which includes a device for integrating resources (CPUs, I/Os, and storages) of servers into one, and a VOD distribution system including the communication apparatus and plural servers.

Figure 20:
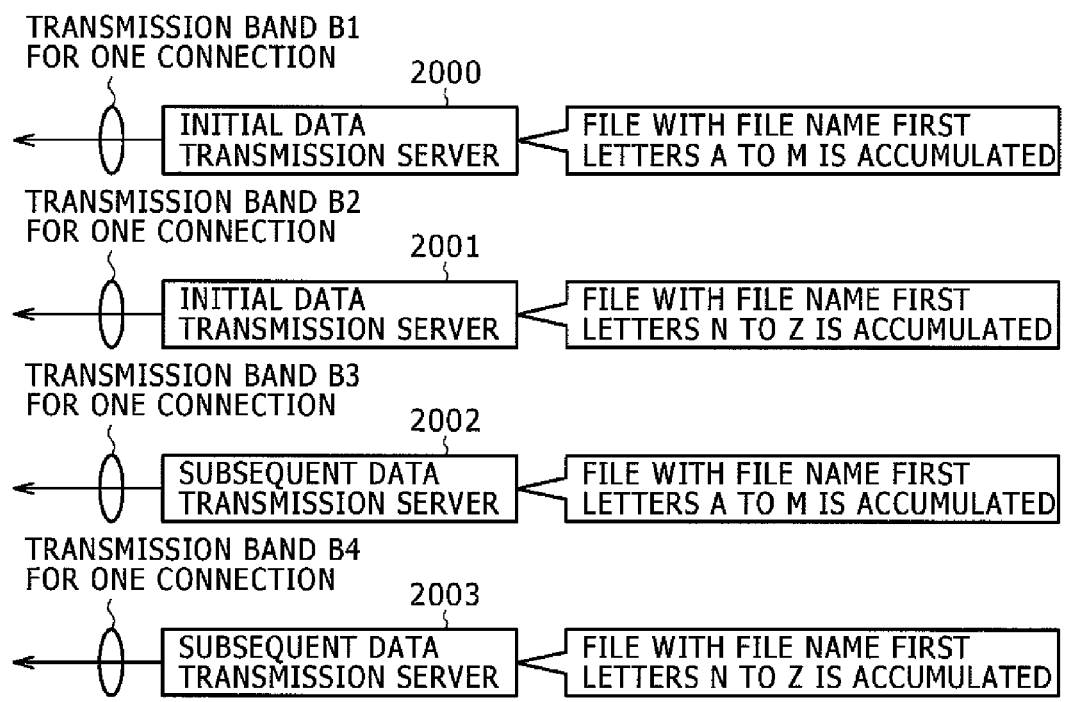
FIG. 20 is an explanation diagram of transmission bands of the server according to the embodiment of the present invention.

FIG. 20 shows an example of an extended system in which a transmission band for one connection is set for each server. Transmission bands for each one connection of servers 2000, 2001, 2002, and 2003 are set to Bn (n=1 to 4). Usage of the system enables changing of the transmission band in accordance with file types.

Figure 21:
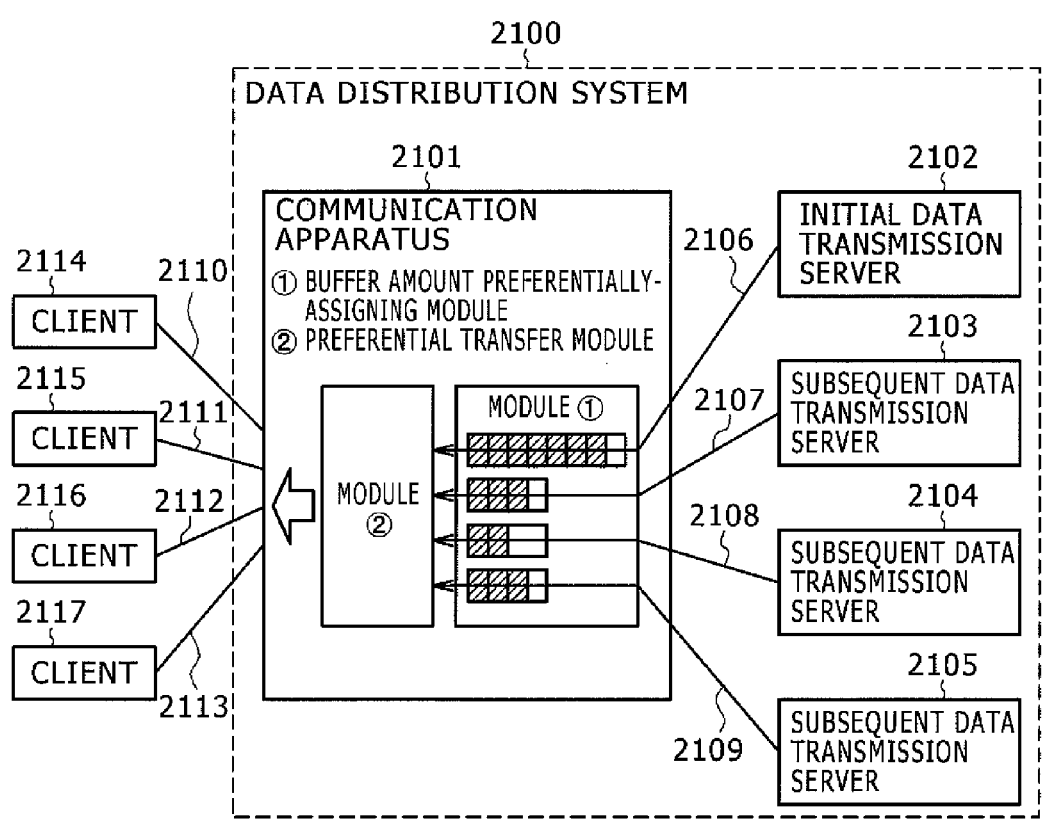
FIG. 21 is an explanation diagram of an extended example of the communication apparatus according to the embodiment of the present invention.

FIG. 21 shows an example of an extended system in which a buffer amount assigned is changed or preferential transfer is controlled on the transmission apparatus side in accordance with the type of a server connected to communication apparatus. A communication apparatus 2101 includes a buffer amount preferentially-assigning module for preferentially accumulating a packet transmitted by the initial data transmission server into a buffer and a preferential transfer module for preferentially transferring a packet transmitted by the initial data transmission server. Usage of the system improves the quality of communications immediately after a file access request.

Figure 22:
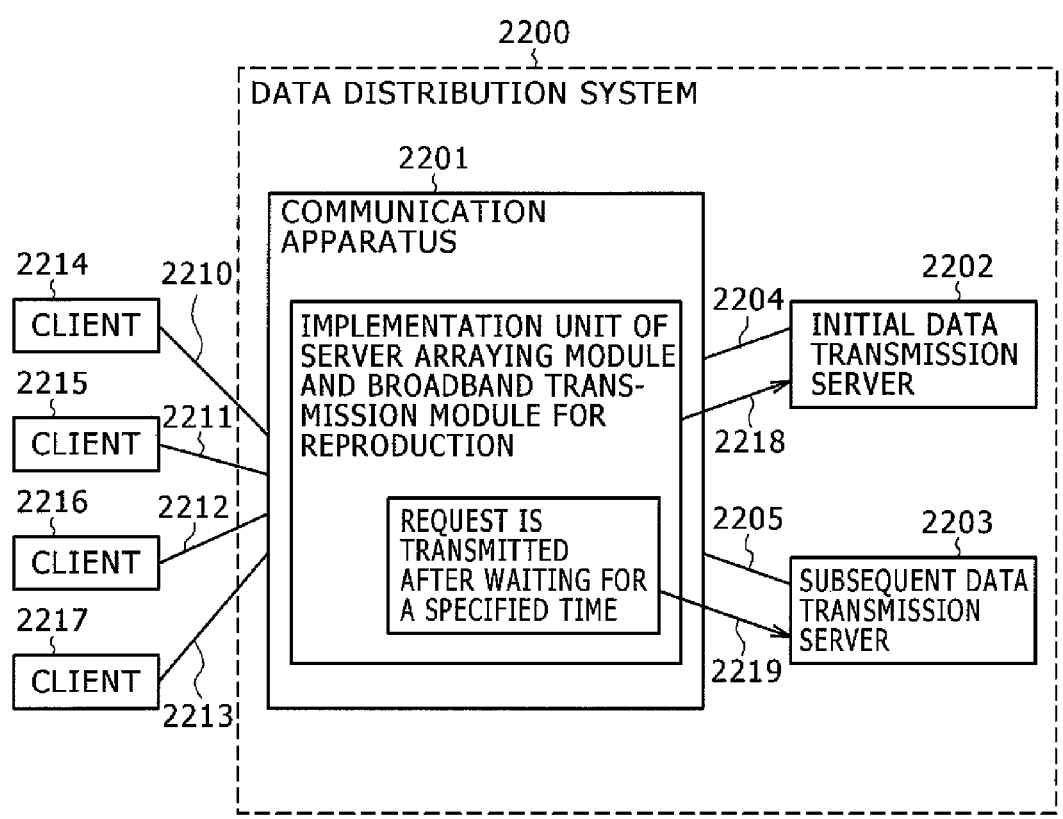
FIG. 22 is an explanation diagram of an extended example of the data distribution system according to the embodiment of the present invention.
Figure 25:
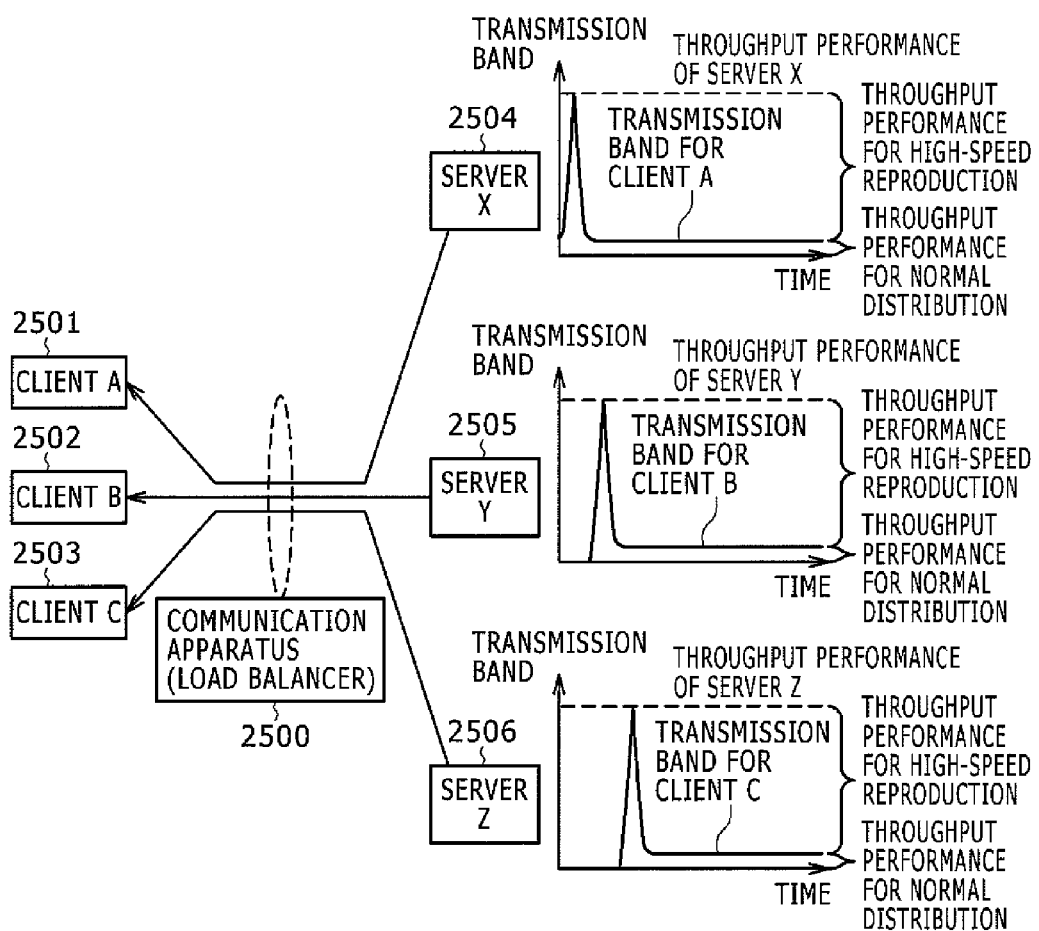
FIG. 25 is an explanation diagram of an example of a conventional data distribution system.
Figure 26:
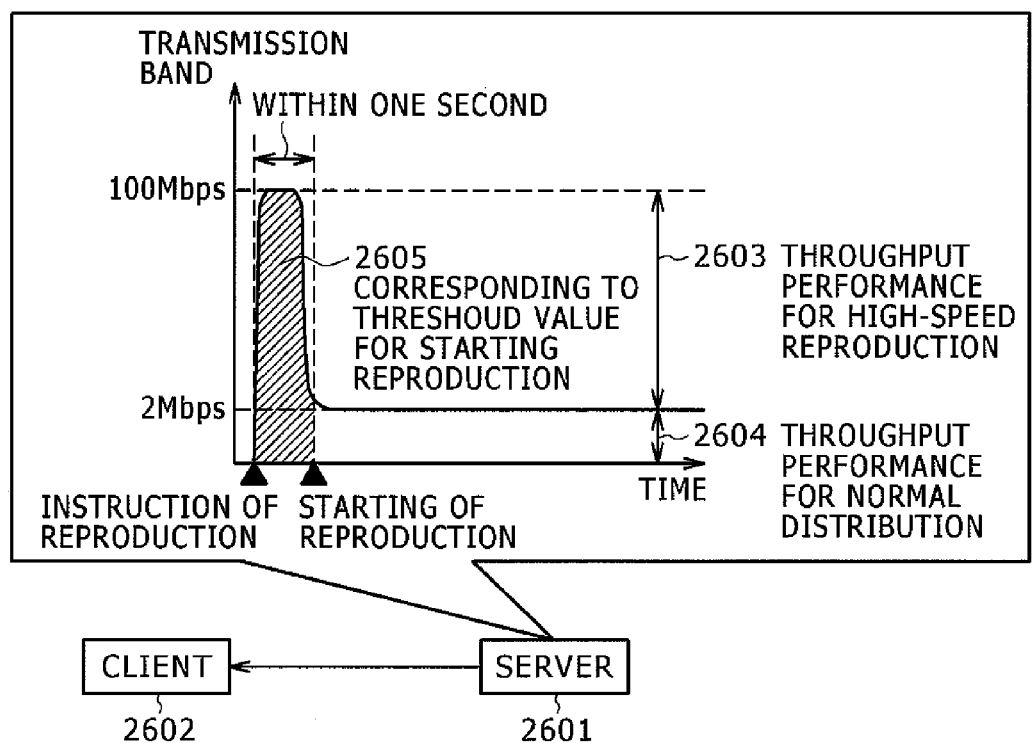
FIG. 26 is an explanation diagram of data transmission bands of a data distribution server.
Figure 27:
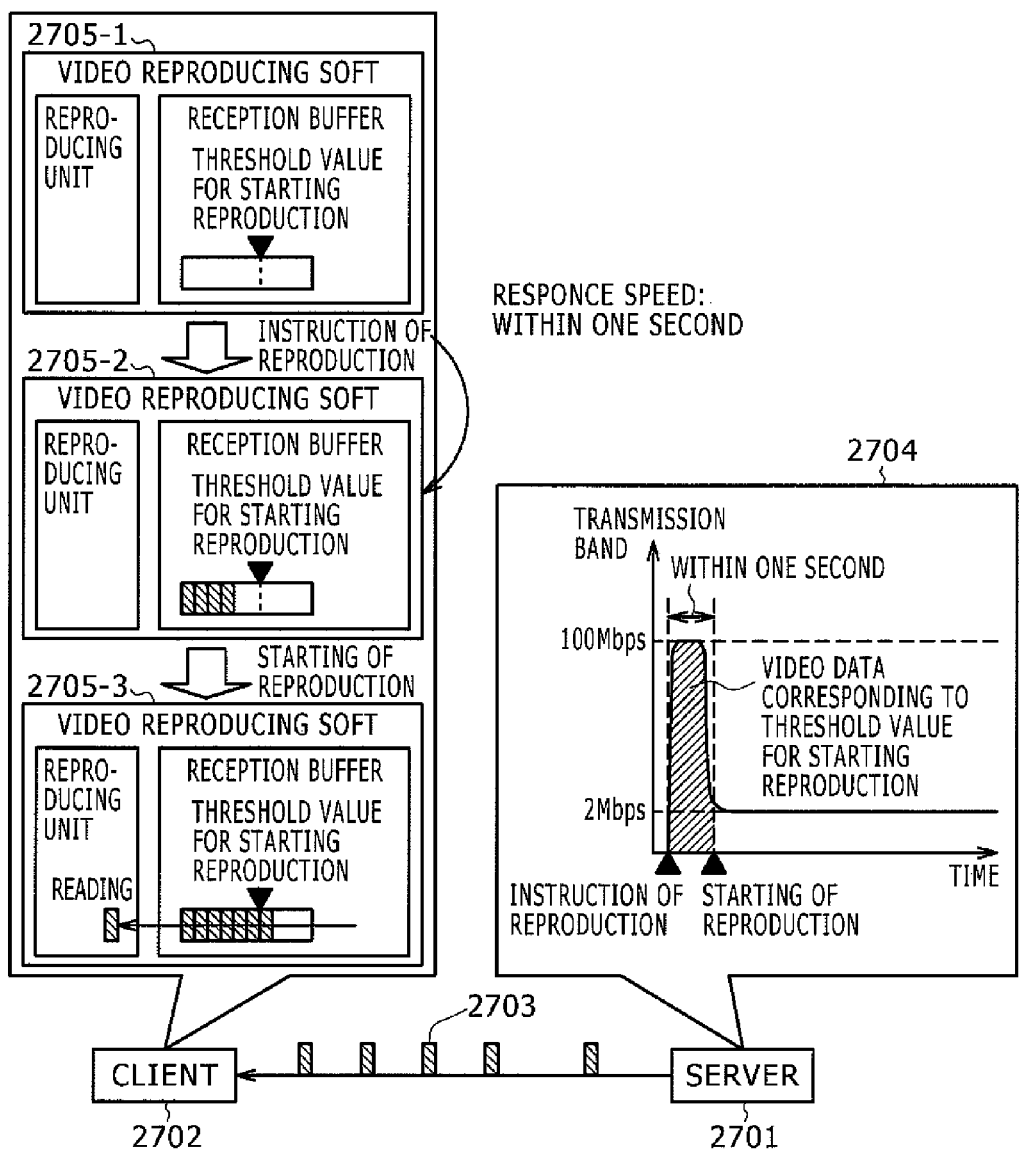
FIG. 27 is an explanation diagram of data transmission bands of a data distribution server and data reproducing software mounted in a client.
Figure 28:
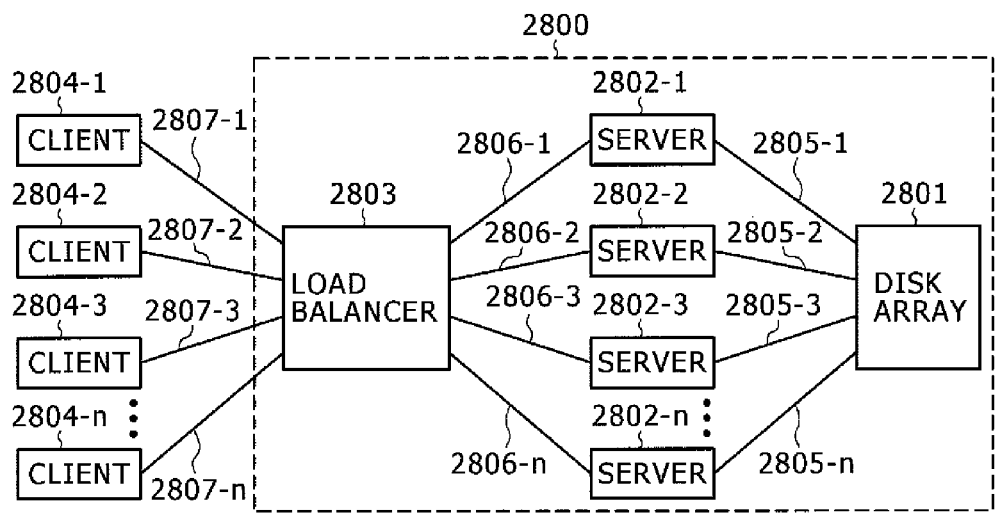
FIG. 28 is an explanation diagram of an example of the conventional data distribution system.

FIG. 22 shows an extended system in which a UDP is used instead of a TCP. When receiving a file access request from a client, a communication apparatus 2201 transmits the file access request to an initial data transmission server 2202, and transmits the file access request to a subsequent data transmission server 2203 after waiting for a specified time (time specified using a value obtained by dividing the data size corresponding a threshold value for starting reproduction of the reception buffer by the normal communication band of the subsequent data transmission server). Upon receiving a request 2218, an initial data transmission server 2202 distributes data corresponding to the reception buffer. When receiving a request 2219, a subsequent data transmission server 2203 distributes subsequent data. Usage of the system enables data distribution using a UDP.

Figure 30:
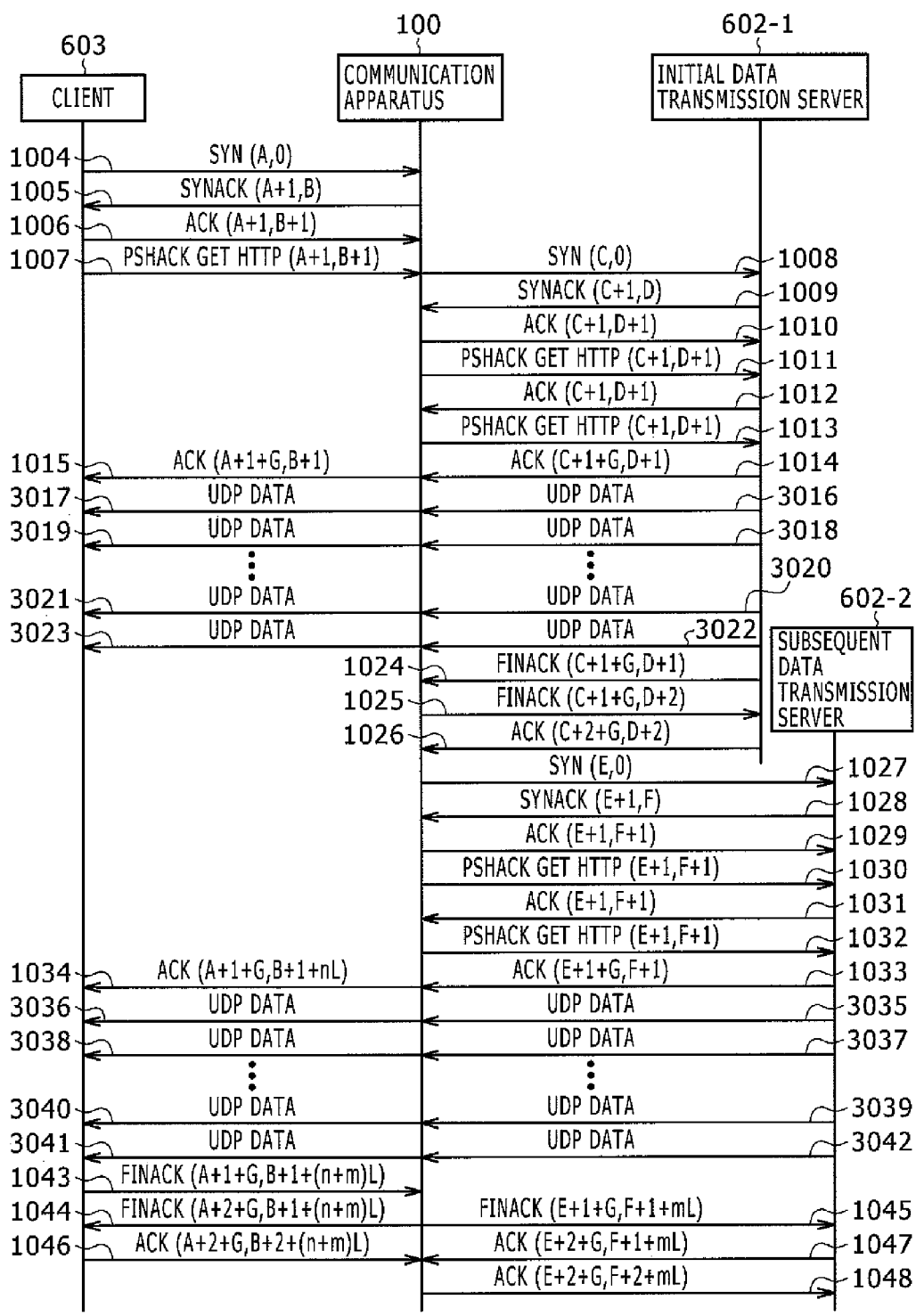
FIG. 30 is a sequence diagram for a case of using a UDP according to the embodiment of the present invention.

FIG. 30 shows a sequence diagram using a UDP.

Until data transmission is started, the communication connection is established using a TCP (the packets 1004 to 1015). When the communication connection with the initial data transmission server is established, initial data is transmitted from the initial data transmission server using a UDP (the packets 3016 to 3023). When the transmission of the initial data is completed, the communication connection with the initial data transmission server is disconnected using a TOP, and the communication connection with the subsequent data transmission server is newly established (the packets 1024 to 1034). When the communication connection with the subsequent data transmission server is established, subsequent data is transmitted from the subsequent data transmission server using a UDP (the packets 3035 to 3042). When the transmission of the subsequent data is completed, the communication connection with the subsequent data transmission server is disconnected using a TCP (the packets 1043 to 1048).

The invention claimed is:

1. A network system comprising a first server and a second server which transmit data to a data destination apparatus, and a communication apparatus which is connected to the data destination apparatus, the first server and the second server through communication lines, wherein the communication apparatus includes: a first reception unit which receives a first file access request for requesting transmission of data in files contained in the first server and the second server from the data destination apparatus; a file access request processing unit which generates, on the basis of the first file access request, a second file access request for requesting the first server to transmit part of data in the files and a third file access request for requesting the second server to transmit data subsequent to the part of data in the files; and a first transmission unit which transmits the second file access request to the first server, and transmits the third file access request to the second server after the first server completes the transmission of the part of data on the basis of the second file access request, the first server includes: a second reception unit which receives the second file access request transmitted by the communication apparatus; and a second transmission unit which transmits the part of data in the files on the basis of the second file access request, and the second server includes: a third reception unit which receives the third file access request; and a third transmission unit which transmits the data subsequent to the part of data in the files on the basis of the third file access request.

2. The network system according to claim 1, wherein the first server transmits the part of data in a broader band than the second server.

3. The network system according to claim 1, wherein the communication apparatus includes an information storing device for storing payload data of the first file access request.

4. The network system according to claim 1, wherein the volume of the part of data is a defined value.

5. The network system according to claim 1, wherein a plurality of the first servers and a plurality of the second servers are provided, and the communication apparatus transmits the second file access request to the first server which is connected to the minimum number of the data destination apparatuses, and transmits the third file access request to the second server which is connected to the minimum number of the data destination apparatuses.

6. The network system according to claim 1, wherein a plurality of the first servers and a plurality of the second servers are provided, and the communication apparatus determines a specific first server to which the second file access request is transmitted on the basis of a first server identifier generated from information related to the files or the information related to the files, and determines a specific second server to which the third file access request is transmitted on the basis of a second server identifier generated from information related to the files or the information related to the files.

7. The network system according to claim 1, wherein the plurality of first servers and the plurality of second servers are provided, and the communication apparatus determines a specific first server to which the second file access request is transmitted on the basis of a first server identifier generated from information related to the data destination apparatus or the information related to the data destination apparatus, and determines a specific second server to which the third file access request is transmitted on the basis of a second server identifier generated from information related to the data destination apparatus or the information related to the data destination apparatus.

8. A network system comprising a first server and a second server which transmit data to a data destination apparatus, and a communication apparatus which is connected to the data destination apparatus, the first server and the second server through communication lines, wherein the communication apparatus includes: a first reception unit which receives a first file access request for requesting transmission of data in files contained in the first server and the second server from the data destination apparatus; a file access request processing unit which generates, on the basis of the first file access request, a second file access request for requesting the first server to transmit part of data in the files and a third file access request for requesting the second server to transmit data subsequent to the part of data in the files; and a first transmission unit which transmits the second file access request to the first server, and transmits the third file access request to the second server when a specified time passes after transmission of the second file access request, the first server includes: a second reception unit which receives the second file access request transmitted by the communication apparatus; and a second transmission unit which transmits the part of data in the files on the basis of the second file access request, and the second server includes: a third reception unit which receives the third file access request; and a third transmission unit which transmits the data subsequent to the part of data in the files on the basis of the third file access request.

* * * * *